(12) United States Patent
Lee et al.

(10) Patent No.: US 11,653,101 B2
(45) Date of Patent: May 16, 2023

(54) IMAGING SYSTEM FOR GENERATING HIGH DYNAMIC RANGE IMAGE

(71) Applicant: SAMSUNG ELECTRONICS CO., LTD., Suwon-si (KR)

(72) Inventors: Jeongguk Lee, Seoul (KR); Yunseok Choi, Seoul (KR); Jaeseong Yu, Suwon-si (KR); Sangwoo Lee, Seoul (KR); Yongchul Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 445 days.

(21) Appl. No.: 16/800,579

(22) Filed: Feb. 25, 2020

(65) Prior Publication Data
US 2020/0366827 A1 Nov. 19, 2020

(30) Foreign Application Priority Data

May 17, 2019 (KR) .................. 10-2019-0058397
Sep. 3, 2019 (KR) .................. 10-2019-0108760

(51) Int. Cl.
*H04N 5/235* (2006.01)
*G06T 5/00* (2006.01)

(52) U.S. Cl.
CPC .......... *H04N 5/2355* (2013.01); *G06T 5/009* (2013.01); *H04N 5/2351* (2013.01); *H04N 5/2353* (2013.01); *G06T 2207/20208* (2013.01)

(58) Field of Classification Search
CPC .. H04N 5/2355; H04N 5/2351; H04N 5/2353; H04N 5/23245; H04N 5/347; H04N 5/35554; H04N 5/37457; H04N 9/04511; H04N 9/04557; H04N 5/355; G06T 5/009; G06T 2207/20208
See application file for complete search history.

(56) References Cited

U.S. PATENT DOCUMENTS

| | | | |
|---|---|---|---|
| 8,059,174 B2 | 11/2011 | Mann et al. | |
| 8,456,523 B2 | 6/2013 | Stork Genannt Wersborg et al. | |
| 8,625,012 B2 | 1/2014 | Yuan et al. | |
| 8,724,921 B2 | 5/2014 | Jin et al. | |
| 8,810,663 B2 | 8/2014 | Lin et al. | |
| 8,817,160 B2 | 8/2014 | Lee et al. | |
| 8,928,792 B1 | 1/2015 | Hynecek et al. | |
| 9,056,368 B2 | 6/2015 | Stork Genannt Wersborg | |
| 9,080,992 B2 | 7/2015 | Olsson et al. | |

(Continued)

FOREIGN PATENT DOCUMENTS

| | | |
|---|---|---|
| JP | 2013-121093 A | 6/2013 |
| WO | 2017/208638 A1 | 7/2017 |

*Primary Examiner* — Luong T Nguyen
(74) *Attorney, Agent, or Firm* — Sughrue Mion, PLLC

(57) ABSTRACT

An imaging system includes an image sensor configured to obtain first image data, based on a received light; and a processing circuit configured to determine an operating mode of the image sensor, among a first mode and a second mode, based on an illumination and a dynamic range corresponding to the obtained first image data. The image sensor includes a first sub-pixel configured to sense a target light corresponding to a target color, in the first mode, convert the target light sensed during a first exposure time, into a first signal, and in the second mode, convert the target light sensed during a second exposure time longer than the first exposure time, into a second signal.

20 Claims, 16 Drawing Sheets

(56) References Cited

U.S. PATENT DOCUMENTS

| | | |
|---|---|---|
| 9,083,898 B2 | 7/2015 | Kanemitsu et al. |
| 9,105,097 B2 | 8/2015 | Rous |
| 9,160,936 B1 | 10/2015 | Rivard et al. |
| 9,258,453 B2 | 2/2016 | Kato et al. |
| 9,277,135 B2 | 3/2016 | Ichikawa |
| 9,380,218 B2 | 6/2016 | Chen et al. |
| 9,402,061 B2 | 7/2016 | Di Giamberardino et al. |
| 9,406,028 B2 | 8/2016 | Humann |
| 9,451,173 B2 | 9/2016 | Kang et al. |
| 9,492,886 B2 | 11/2016 | Stork Genannt Wersborg |
| 9,531,958 B2 | 12/2016 | Kasai |
| 9,544,505 B2 | 1/2017 | Tsuzuki |
| 9,554,059 B1 | 1/2017 | Lin et al. |
| 9,648,251 B2 | 5/2017 | Pouli et al. |
| 9,690,088 B2 | 6/2017 | Karube et al. |
| 9,762,810 B2 | 9/2017 | Conneely et al. |
| 9,813,635 B2 | 11/2017 | Richards |
| 9,871,965 B2 | 1/2018 | Dabral |
| 9,881,953 B2 | 1/2018 | Park |
| 9,883,114 B2 | 1/2018 | Einecke et al. |
| 9,888,198 B2 * | 2/2018 | Mauritzson ........ H04N 9/04557 |
| 9,996,488 B2 | 6/2018 | Sengoku |
| 10,021,313 B1 | 7/2018 | Chen et al. |
| 10,057,492 B2 | 8/2018 | Numako |
| 10,109,228 B2 | 10/2018 | Hoffman et al. |
| 10,134,788 B2 | 11/2018 | Lyu et al. |
| 10,136,084 B1 | 11/2018 | Solheim et al. |
| 10,148,906 B2 | 12/2018 | Seifi et al. |
| 10,180,615 B2 | 1/2019 | Kilgore et al. |
| 10,270,981 B2 | 4/2019 | Meuter et al. |
| 10,277,798 B2 | 4/2019 | Chien et al. |
| 2013/0057744 A1* | 3/2013 | Minagawa ............ H04N 5/369 348/311 |
| 2014/0192250 A1* | 7/2014 | Mitsunaga ............ H04N 5/374 348/349 |
| 2015/0312463 A1* | 10/2015 | Gupta ................. H04N 5/2355 348/239 |
| 2016/0057332 A1* | 2/2016 | Ciurea ............... H04N 5/23232 348/218.1 |

\* cited by examiner

IMAGING SYSTEM FOR GENERATING HIGH DYNAMIC RANGE IMAGE

CROSS-REFERENCE TO THE RELATED APPLICATIONS

This application is based on and claims priority under 35 U.S.C. § 119 to Korean Patent Application Nos. 10-2019-0058397, filed on May 17, 2019, and 10-2019-0108760, filed on Sep. 3, 2019, in the Korean Intellectual Property Office, the disclosures of which are incorporated by reference herein in their entireties.

BACKGROUND

The disclosure relates to an imaging system, and more particularly, relates to an imaging system for generating a high dynamic range (HDR) image.

An imaging system is a system for providing an image captured from a camera to a user. The imaging system may be implemented with various types of electronic devices such as a smartphone. To provide a high-quality image to the user or to express a subject exactly, the imaging system may make a dynamic range of an image better. The dynamic range means a range capable of expressing illumination from a dark portion to a bright portion in an image.

There are provided various schemes for generating the HDR image with an improved dynamic range. For example, the imaging system may generate the HDR image by obtaining and combining images corresponding to different exposure times. However, depending on a dynamic range of an image, it is unnecessary to generate an HDR image or a high-quality HDR image. In this case, a power may be unnecessarily consumed to generate the HDR image.

SUMMARY

According to embodiments, an imaging system includes an image sensor configured to obtain first image data, based on a received light, and a processing circuit configured to determine an operating mode of the image sensor, among a first mode and a second mode, based on an illumination and a dynamic range corresponding to the obtained first image data. The image sensor includes a first sub-pixel configured to sense a target light corresponding to a target color, in the first mode, convert the target light sensed during a first exposure time, into a first signal; and, in the second mode, convert the target light sensed during a second exposure time longer than the first exposure time, into a second signal. The image sensor further includes a second sub-pixel sharing a floating diffusion area with the first sub-pixel, and configured to sense the target light, in the first mode, convert the target light sensed during the first exposure time into a third signal, and in the second mode, convert the target light sensed during the first exposure time into a fourth signal. The image sensor further includes a converting circuit configured to obtain second image data, based on the first signal and the third signal into which the target light is converted in the first mode, and obtain third image data, based on the second signal and the fourth signal into which the target light is converted in the second mode.

According to embodiments, an imaging system includes an image sensor including a pixel array that includes a plurality of sub-pixels, each of the plurality of sub-pixels generating an electrical signal based on a received light, and a converting circuit configured to obtain image data, based on the electrical signal generated by each of the plurality of sub-pixels. The imaging system further includes a processing circuit configured to obtain an illumination and a dynamic range, based on the obtained image data, change an exposure time of any one or any combination of the plurality of sub-pixels, based on the obtained illumination and the obtained dynamic range, and perform high dynamic range (HDR) processing on the obtained image data.

According to embodiments, an imaging system includes an image sensor including a pixel array that includes first sub-pixels sharing a first floating diffusion area corresponding to a first color, second sub-pixels sharing a second floating diffusion area corresponding to a second color, and third sub-pixels sharing a third floating diffusion area corresponding to a third color. The image sensor further includes a converting circuit configured to obtain current image data, based on signals that are output from the first sub-pixels, the second sub-pixels and the third sub-pixels. The imaging system further includes a processing circuit configured to obtain an illumination and a dynamic range corresponding to the obtained current image data, perform high dynamic range (HDR) processing on next image data that is obtained after the obtained current image data, based on the obtained illumination and the obtained dynamic range, determine an operating mode of the image sensor, among a first mode and a second mode based on the obtained illumination and the obtained dynamic range, in the first mode, control a first exposure time of a first one among the first sub-pixels, a first one among the second sub-pixels, and a first one among the third sub-pixels, to be set to a first time duration, in the first mode, control a second exposure time of a second one among the first sub-pixels, a second one among the second sub-pixels, and a second one among the third sub-pixels, to be set to a second time duration, and in the second mode, control a third exposure time of the first sub-pixels, the second sub-pixels and the third sub-pixels, to be set to the first time duration.

DETAILED DESCRIPTION

Below, embodiments will be described clearly and in detail with reference to accompanying drawings to such an extent that an ordinary one in the art implements the embodiments.

The embodiments provide an imaging system for generating an HDR image with an improved performance while reducing power consumption.

Figure 1:
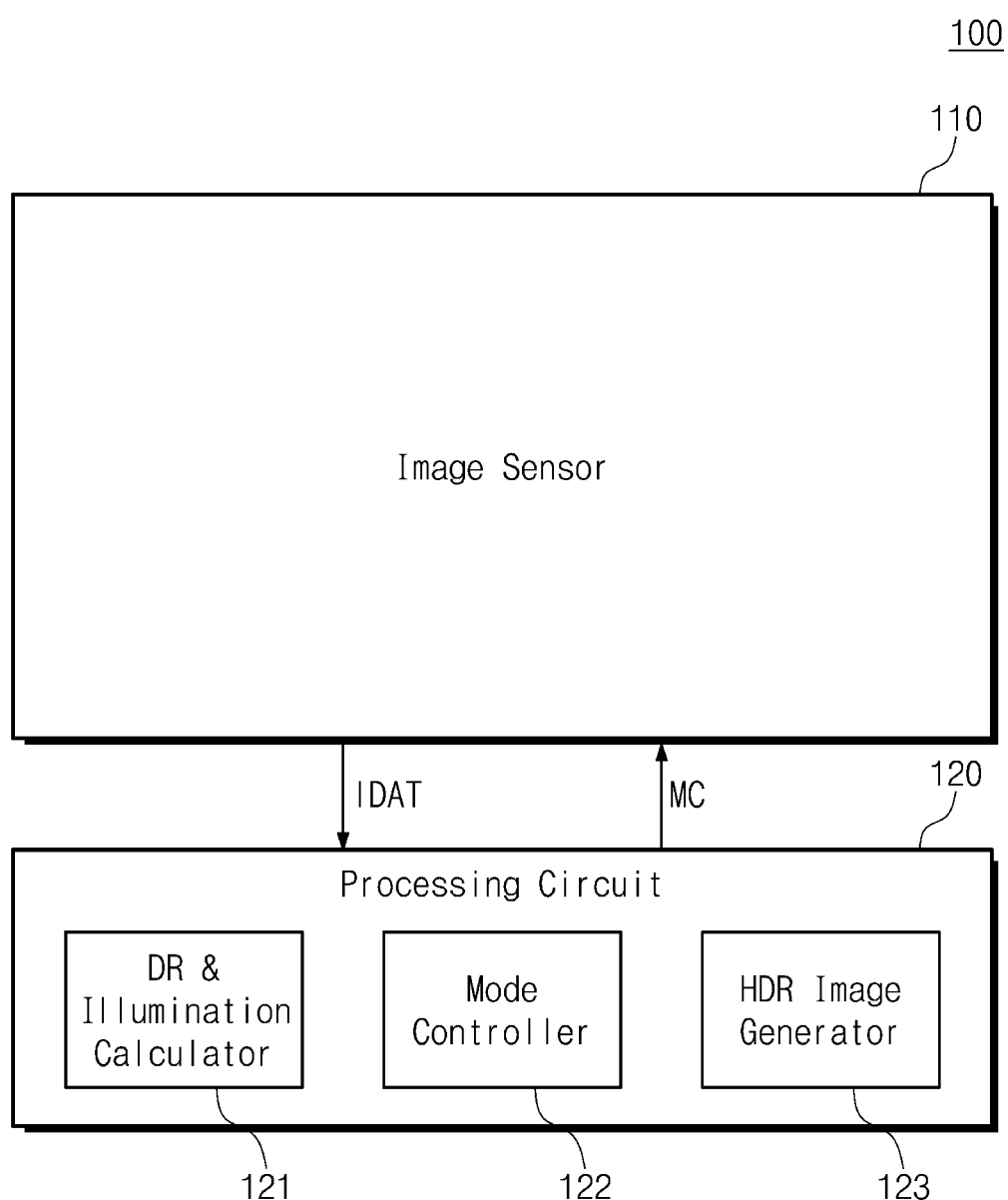
FIG. 1 is a block diagram of an imaging system according to embodiments.

FIG. 1 is a block diagram of an imaging system according to embodiments. An imaging system 100 may be implemented with various types of electronic devices or electronic circuits. For example, the imaging system 100 may be one of a desktop computer, a laptop computer, a tablet computer, a smartphone, a wearable device, or an electric vehicle. For example, the imaging system 100 may be implemented with an integrated circuit (IC) or a system on chip (SoC). However, the embodiments are not limited thereto. For example, the imaging system 100 may be implemented with any kind of device or circuit that obtains and process an image.

Referring to FIG. 1, the imaging system 100 may include an image sensor 110 and a processing circuit 120. The image sensor 110 and the processing circuit 120 may be integrated in one chip, but the embodiments are not limited thereto. For example, the image sensor 110 and the processing circuit 120 may be implemented with separate chips, respectively.

The image sensor 110 may output image data IDAT based on a light received from the outside. The image sensor 110 may include a plurality of pixels. The plurality of pixels may convert the received light into an electrical signal. The image sensor 110 may convert the electrical signal being an analog signal to a digital signal to generate the image data IDAT. The image data IDAT may include brightness information and color information of a frame. The image data IDAT may be provided to the processing circuit 120. The image sensor 110 will be more fully described later.

The processing circuit 120 may perform various image processing operations based on the received image data IDAT. The processing circuit 120 may perform various operations for image processing. For example, the processing circuit 120 may perform image processing such that the image data IDAT received from the image sensor 110 are displayed in a display device. The processing circuit 120 may include a dynamic range and illumination calculator 121, a mode controller 122, and a high dynamic range (HDR) image generator 123.

The dynamic range and illumination calculator 121 may calculate a dynamic range of a frame corresponding to the received image data IDAT. The dynamic range may be calculated based on a ratio of the brightest portion to the darkest portion in the image data IDAT. For example, the dynamic range and illumination calculator 121 may extract a pixel value corresponding to the darkest portion and a pixel value corresponding to the brightest portion from the image data IDAT. For example, the dynamic range and illumination calculator 121 may calculate a ratio between a maximum value and a minimum value of pixel values of the image data IDAT. Here, the maximum value and the minimum value may be determined based on pixel values corresponding to a unit pixel.

The dynamic range and illumination calculator 121 may calculate an illumination of the frame corresponding to the received image data IDAT. For example, the dynamic range and illumination calculator 121 may sum up the pixel values of the image data IDAT. For example, the dynamic range and illumination calculator 121 may calculate an illumination based on a value obtained by dividing the summed value by an exposure time in which a light is received to generate the image data IDAT.

The mode controller 122 may determine an operating mode of the imaging system 100 based on the calculated dynamic range and the calculated illumination. Depending on the operating mode, the processing circuit 120 may determine whether to generate an HDR image based on the image data IDAT. Also, depending on the operating mode, the processing circuit 120 may determine a scheme to generate the HDR image.

In a strong back light condition (or situation) that a dynamic range is great and an external illumination is great, the mode controller 122 may determine an operating mode (e.g., a first mode) for generating the image data IDAT based on three different exposure times and generating an HDR image based on the generated image data IDAT. In the case in which a dynamic range corresponding to the image data IDAT is greater than a reference dynamic range and an illumination is greater than a reference illumination, the mode controller 122 may generate a mode control signal MC such that the image data IDAT are generated based on three different exposure times. Here, the reference dynamic range and the reference illumination may be understood as a reference for determining a condition to generate a high-performance HDR image due to a great difference of a bright portion and a dark portion of an image, such as a condition that a strong back light is provided.

Even though a dynamic range and an illumination do not correspond to the case in which three exposure times are used, in the case in which HDR image processing is performed to express a subject exactly, the mode controller 122 may determine an operating mode (e.g., a second mode) for generating the image data IDAT based on two different exposure times and generating an HDR image based on the generated image data IDAT. Alternatively, the mode controller 122 may determine an operating mode (e.g., a third mode) for generating the image data IDAT based on one exposure time and generating an HDR image based on the generated image data IDAT. A reference dynamic range and a reference illumination for distinguishing between the first mode and the second mode, between the first mode and the third mode, or between the second mode and the third mode may be in advance set.

In the case in which a dynamic range or an illumination is low to such an extent that HDR image processing is not required, the mode controller 122 may determine an operating mode (e.g., a fourth mode) for generating the image data IDAT based on one exposure time and omitting HDR image processing. A reference dynamic range and a reference illumination for distinguishing between the fourth mode and any one or any combination of the first to third modes may be in advance set.

The mode controller 122 may provide the mode control signal MC corresponding to the determined operating mode to the image sensor 110 and the HDR image generator 123. The image sensor 110 may adjust an exposure time in which each pixel receives a light, based on the mode control signal MC. The HDR image generator 123 may perform an HDR image processing operation corresponding to an operating mode based on the mode control signal MC.

The mode controller 122 may determine whether to perform HDR image processing and a scheme to process an HDR image, based on a dynamic range and an illumination. Accordingly, there may be prevented an unnecessary HDR image processing operation, or an HDR image processing operation that is excessive compared to an ambient condition (or situation). Also, power consumption of the HDR image processing process may be reduced.

The mode controller 122 may change an operating mode in real time, based on the image data IDAT received from the image sensor 110. The mode controller 122 may analyze the received image data IDAT in real time to determine an operating mode. When there is a change of an operating mode such as a change of a dynamic range or an illumination, the mode controller 122 may generate the mode control signal MC such that there is changed an exposure time or an HDR image generating scheme for next frames. As such, an operating mode may be changed seamlessly without a frame drop or a latency.

The HDR image generator 123 may perform HDR image processing of the image data IDAT based on the operating mode determined by the mode controller 122. To this end, the HDR image generator 123 may receive the mode control signal MC from the mode controller 122. The HDR image generator 123 may perform HDR image processing corresponding to each of the first to third modes. The HDR image generator 123 may not perform HDR image processing based on the mode control signal MC indicating the fourth mode.

For example, in the first mode, the HDR image generator 123 may separate first to third sub-images respectively corresponding to three exposure times from the image data IDAT. The HDR image generator 123 may generate an HDR image by correcting pixel values of each of the first to third sub-images and merging the corrected pixel values of the first to third sub-images. As such, the HDR image generator 123 may generate an HDR image having the greatest dynamic range (e.g., a level of approximately 100 dB) in the first mode.

For example, in the second mode, the HDR image generator 123 may separate first and second sub-images respectively corresponding to two exposure times from the image data IDAT. The HDR image generator 123 may generate an HDR image by correcting pixel values of each of the first and second sub-images and merging the corrected pixel values of the first and second sub-images. As such, in the second mode, the HDR image generator 123 may generate an HDR image having the second highest dynamic range (e.g., a level of approximately 80 dB).

For example, in the third mode, the HDR image generator 123 may generate an HDR image by performing tone mapping processing on the image data IDAT. Because the image sensor 110 generates the image data IDAT based on one exposure time, the image sensor 110 may generate an HDR image without merging. As such, in the third mode, the HDR image generator 123 may generate an HDR image having a smaller dynamic range than in the first and second modes. Power consumption due to the HDR image processing in the third mode may be smaller than power consumption due to the HDR image processing in the first and second modes.

For example, in the fourth mode, the HDR image generator 123 may not generate an HDR image. The HDR image generator 123 may not perform tone mapping on the image data DAT generated based on one exposure time. As a result, a dynamic range of an image processed in the fourth mode may be small compared to the first to third modes. However, power consumption of the imaging system 100 in the fourth mode may be smaller than in the first to third modes.

Figure 2:
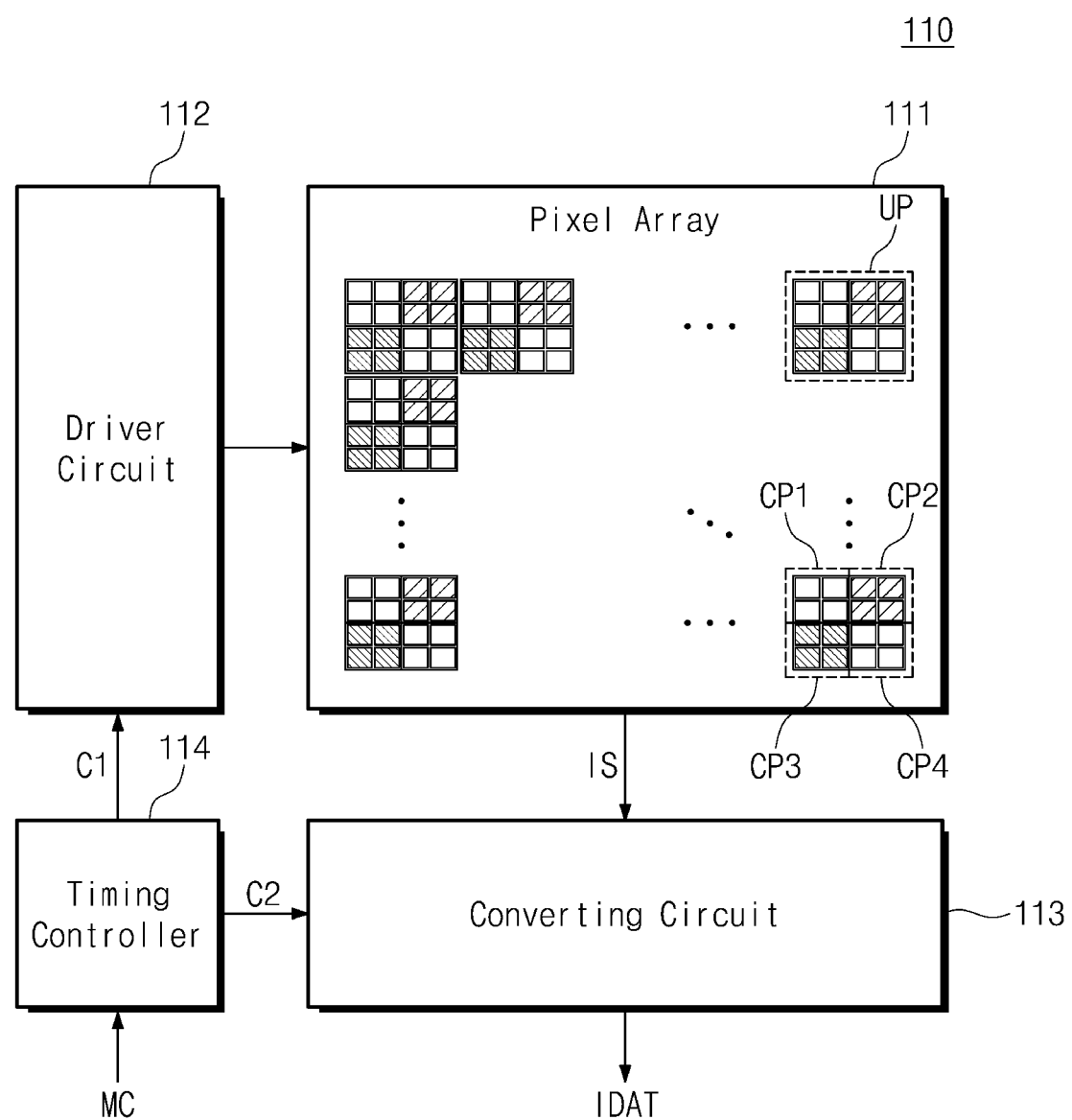
FIG. 2 is a block diagram of an image sensor of FIG. 1.

FIG. 2 is a block diagram of an image sensor of FIG. 1. Referring to FIG. 2, the image sensor 110 may include a pixel array 111, a driver circuit 112, a converting circuit 113, and a timing controller 114.

The pixel array 111 includes a plurality of pixels arranged two-dimensionally. Each of the plurality of pixels may convert a received light into an electrical signal. The pixel array 111 may be controlled by driving signals that are provided from the driver circuit 112. In response to the driving signals, the plurality of pixels may generate an electrical signal IS being an analog signal. The electrical signal IS may be provided to the converting circuit 113 through a plurality of column lines.

The pixel array 111 includes a unit pixel UP for sensing a blue color, a green color, and a red color, respectively. The unit pixel UP may include unit color pixels CP1, CP2, CP3, and CP4 for sensing the respective colors. Each of the unit color pixels CP1, CP2, CP3, and CP4 may include a color filter that selectively transmits the corresponding color. For example, the first and fourth unit color pixels CP1 and CP4 may sense a green color, the second unit color pixel CP2 may sense a red color, and the third unit color pixel CP3 may sense a blue color. However, the embodiments are not limited thereto. For example, any one or any combination of various colors may be sensed from a unit color pixel. For example, each of the unit color pixels CP1, CP2, CP3, and CP4 may sense a color such as yellow, cyan, or magenta.

Each of the unit color pixels CP1, CP2, CP3, and CP4 may include a plurality of sub-pixels. Each of the plurality of sub-pixels may include a photoelectric conversion element for converting a light into an electrical signal. Each sub-pixel may convert a light, which is received during an exposure time set depending on the above operating mode, into an electrical signal. Exposure times of sub-pixels may be different in an operating mode. This will be more fully detailed later.

The driver circuit 112 may generate a driving signal for controlling pixels included in the pixel array 111. The driver circuit 112 may select one or more of a plurality of rows, based on a control signal C1 from the timing controller 114. The driving signal may include a signal for selecting a row, a signal for resetting pixels corresponding to the selected row, and a signal for controlling an exposure time in which a light is received and the electrical signal IS is generated. The signal for controlling the exposure time may be generated based on the mode control signal MC and may be used, for example, to adjust an on/off time of a transmission gate of each pixel. The electrical signal IS generated from pixels of the selected row may be provided to the converting circuit 113.

The converting circuit 113 may convert the electrical signal IS being an analog signal into the image data IDAT being a digital signal. The converting circuit 113 may convert the electrical signal IS into the image data IDAT in response to a control signal C2 from the timing controller 114. For example, the converting circuit 113 may perform correlated double sampling (CDS) for the purpose of extracting an effective signal component. For example, the converting circuit 113 may perform an averaging operation or a binning operation on sub-pixels of each of the unit color pixels CP1 to CP4.

The timing controller 114 may control the pixel array 111, the driver circuit 112, and the converting circuit 113. The timing controller 114 may generate the control signals C1 and C2 including a clock signal and a timing control signal for operations of the pixel array 111, the driver circuit 112, and the converting circuit 113. The timing controller 114 may generate a control signal (e.g., the first control signal C1) for controlling exposure times of pixels based on the mode control signal MC generated by the processing circuit 120 of FIG. 1. For example, the timing controller 114 may include a logic control circuit, a phase locked loop (PLL) circuit, a timing control circuit, a communication interface circuit, etc. Unlike the embodiments illustrated in FIG. 2, the timing controller 114 may be included in the processing circuit 120 of FIG. 1.

Figure 3:
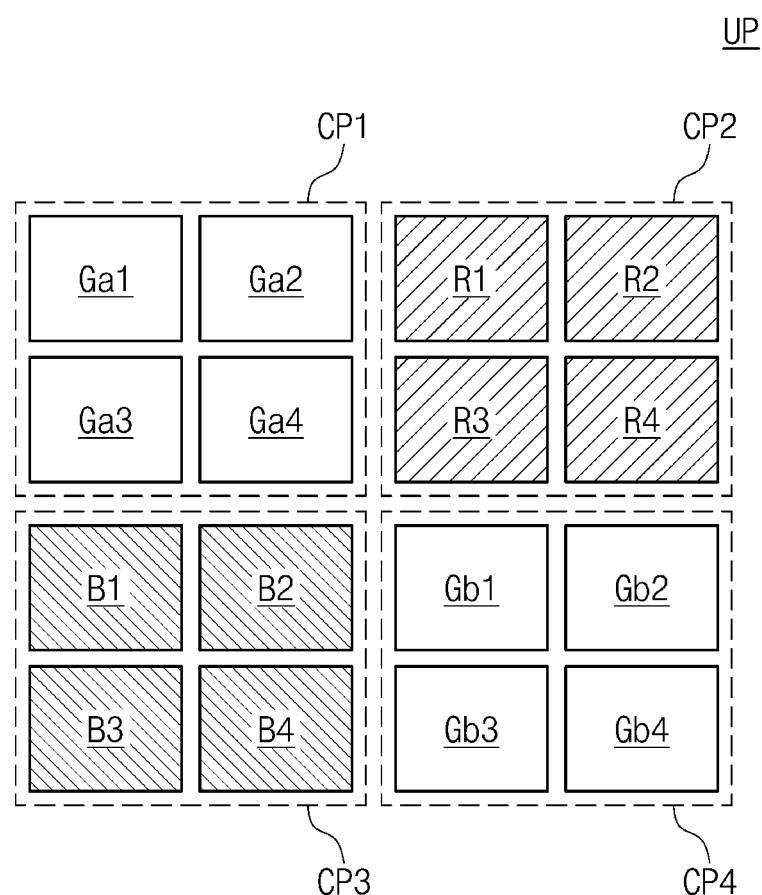
FIG. 3 is a diagram of a unit pixel of FIG. 2.

FIG. 3 is a diagram of a unit pixel of FIG. 2. Referring to FIG. 3, the unit pixel UP may include the first to fourth unit color pixels CP1, CP2, CP3, and CP4. For example, each of the first to fourth unit color pixels CP1, CP2, CP3, and CP4 may include four sub-pixels.

The first unit color pixel CP1 may include first to fourth sub-pixels Ga1, Ga2, Ga3, and Ga4 corresponding to a green color. The second unit color pixel CP2 may include first to fourth sub-pixels R1, R2, R3, and R4 corresponding to a red color. The third unit color pixel CP3 may include first to fourth sub-pixels B1, B2, B3, and B4 corresponding to a blue color. The fourth unit color pixel CP4 may include first to fourth sub-pixels Gb1, Gb2, Gb3, and Gb4 corresponding to the green color.

Sub-pixels included in one unit color pixel may be arranged in a 2×2 matrix, but the embodiments are not limited thereto. For example, sub-pixels included in one unit color pixel may be arranged in various manners such as a 1×4 matrix or a 4×1 matrix. An example in which the number of sub-pixels included in one unit color pixel is 4 is illustrated in FIG. 3, but the embodiments are not limited thereto. For example, one unit color pixel may include nine sub-pixels. Sub-pixels included in one unit color pixel may sense the same color and may be disposed adjacent to each other.

Operations of sub-pixels may vary depending on a low-illumination environment and a high-illumination environment. For example, to secure the clearness of an image in the high-illumination environment, sub-pixels may respectively generate analog electrical signals and may output the electrical signals to the converting circuit 113 of FIG. 2 in the unit of sub-pixel. For example, to secure brightness or sensitivity of an image in the low-illumination environment, sub-pixels may output an analog electrical signal to the converting circuit 113 of FIG. 2 in the unit of unit color pixel.

Sub-pixels may convert a light, which is received during an exposure time determined depending on the operating mode described with reference to FIG. 1, into an electrical signal. In the first mode in which HDR image data are generated based on the three different exposure times described with reference to FIG. 1, each sub-pixel may generate an electrical signal during one exposure time of a first exposure time, a second exposure time shorter than the first exposure time, and a third exposure time shorter than the second exposure time. For example, in the first unit color pixel CP1, the first sub-pixel Ga1 may generate an electrical signal during the first exposure time, each of the second sub-pixel Ga2 and the third sub-pixel Ga3 may generate an electrical signal during the second exposure time, and the fourth sub-pixel Ga4 may generate an electrical signal during the third exposure time.

In the second mode in which HDR image data are generated based on the two different exposure times described with reference to FIG. 1, each sub-pixel may generate an electrical signal during one exposure time of a first exposure time and a second exposure time shorter than the first exposure time. For example, in the first unit color pixel CP1, each of the first sub-pixel Ga1 and the fourth sub-pixel Ga4 may generate an electrical signal during the first exposure time, and each of the second sub-pixel Ga2 and the third sub-pixel Ga3 may generate an electrical signal during the second exposure time.

In the third mode in which HDR image data are generated based on one exposure time described with reference to FIG. 1 or in the fourth mode in which HDR image data are not generated, each sub-pixel may generate an electrical signal during one exposure time. That is, an exposure time of each sub-pixel may be determined depending on an operating mode determined by the mode controller 122 of FIG. 1. How to process image data generated based on the determined exposure time will be more fully described later.

Figure 4:
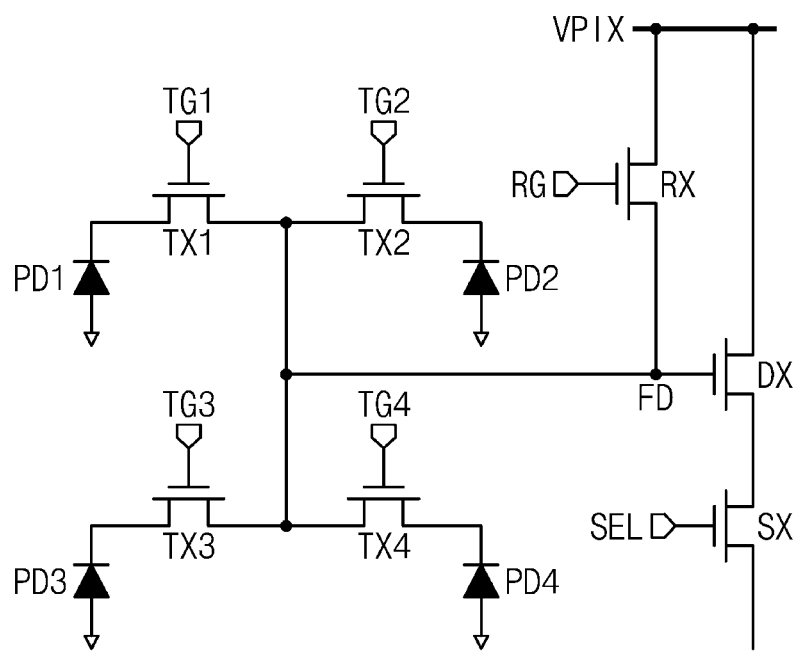
FIG. 4 is a circuit diagram of a unit color pixel of FIG. 3.

FIG. 4 is a circuit diagram of a unit color pixel of FIG. 3. A unit color pixel CP of FIG. 4 may correspond to one of the first to fourth unit color pixels CP1, CP2, CP3, and CP4 of FIG. 3. Referring to FIG. 4, the unit color pixel CP may include first to fourth photoelectric conversion elements PD1, PD2, PD3, and PD4, first to fourth transmission transistors TX1, TX2, TX3, and TX4, a reset transistor RX, a selection transistor SX, and a drive transistor DX. A circuit structure of FIG. 4 is an example, and the unit color pixel CP is not limited to FIG. 4. For example, the unit color pixel CP may further include a conversion gain transistor and a capacitor for constituting a conversion gain varying circuit.

The first to fourth photoelectric conversion elements PD1, PD2, PD3, and PD4 may be photosensitive elements that generate and integrate charges depending on the amount of incident light or the intensity of the incident light. The first to fourth photoelectric conversion elements PD1, PD2, PD3, and PD4 correspond to four sub-pixels included in a unit color pixel, respectively. For example, each of the first to fourth photoelectric conversion elements PD1, PD2, PD3, and PD4 may be implemented with a photo diode, a photo transistor, a photo gate, a pinned photo diode (PPD), or a combination thereof.

The first to fourth transmission transistors TX1, TX2, TX3, and TX4 may be respectively connected to the first to fourth photoelectric conversion elements PD1, PD2, PD3, and PD4. Charges integrated at the first to fourth photoelectric conversion elements PD1, PD2, PD3, and PD4 may be transmitted to a floating diffusion area FD through the first to fourth transmission transistors TX1, TX2, TX3, and TX4. Gate electrodes (or transmission gates) of the first to fourth transmission transistors TX1, TX2, TX3, and TX4 may be respectively controlled by first to fourth charge transmission signals TG1, TG2, TG3, and TG4.

The first to fourth charge transmission signals TG1, TG2, TG3, and TG4 may be generated based on the mode control signal MC of FIG. 2. Exposure times of the first to fourth photoelectric conversion elements PD1, PD2, PD3, and PD4 may be respectively controlled by the first to fourth charge transmission signals TG1, TG2, TG3, and TG4. For example, the first charge transmission signal TG1 may turn on the first transmission transistor TX1 such that charges integrated at the first photoelectric conversion element PD1 are transmitted to the floating diffusion area FD and may turn off the first transmission transistor TX1 such that charges are accumulated at the first photoelectric conversion element PD1. An exposure time may start from the turn-off of the first transmission transistor TX1 and may end at a time when the first transmission transistor TX1 is again turned on such that integrated charges are transmitted to the floating diffusion area FD. A length of an exposure time may be determined based on an operating mode determined by the mode control signal MC.

Photoelectrons transmitted from the first to fourth photoelectric conversion elements PD1, PD2, PD3, and PD4 may be accumulated at the floating diffusion area FD. The first to fourth photoelectric conversion elements PD1, PD2, PD3, and PD4 may share the floating diffusion area FD. That is, sub-pixels included in one unit color pixel may share the floating diffusion area FD. The drive transistor DX may be controlled depending on the amount of photoelectrons accumulated at the floating diffusion area FD.

The reset transistor RX may reset charges accumulated at the floating diffusion area FD. A drain terminal of the reset transistor RX may be connected to the floating diffusion area FD, and a source terminal thereof is connected to a pixel power supply voltage VPIX. When the reset transistor RX is turned on by a reset signal RG, the pixel power supply voltage VPIX may be supplied to the floating diffusion area FD. In this case, charges accumulated at the floating diffusion area FD may be discharged, and thus, the floating diffusion area FD may be reset.

The drive transistor DX may be a source follower buffer amplifier that generates a source-drain current in proportion to the amount of charges of the floating diffusion area FD, which are input to a gate terminal of the drive transistor DX. The drive transistor DX may amplify a potential change of the floating diffusion area FD and may output the amplified signal to a column line through the selection transistor SX.

The selection transistor SX may select the unit color pixel CP to be read in the unit of row. When the selection transistor SX is turned on by the selection signal SEL provided from the driver circuit 112 of FIG. 2, an analog electrical signal output from the drive transistor DX may be output to the column line.

Figure 5:
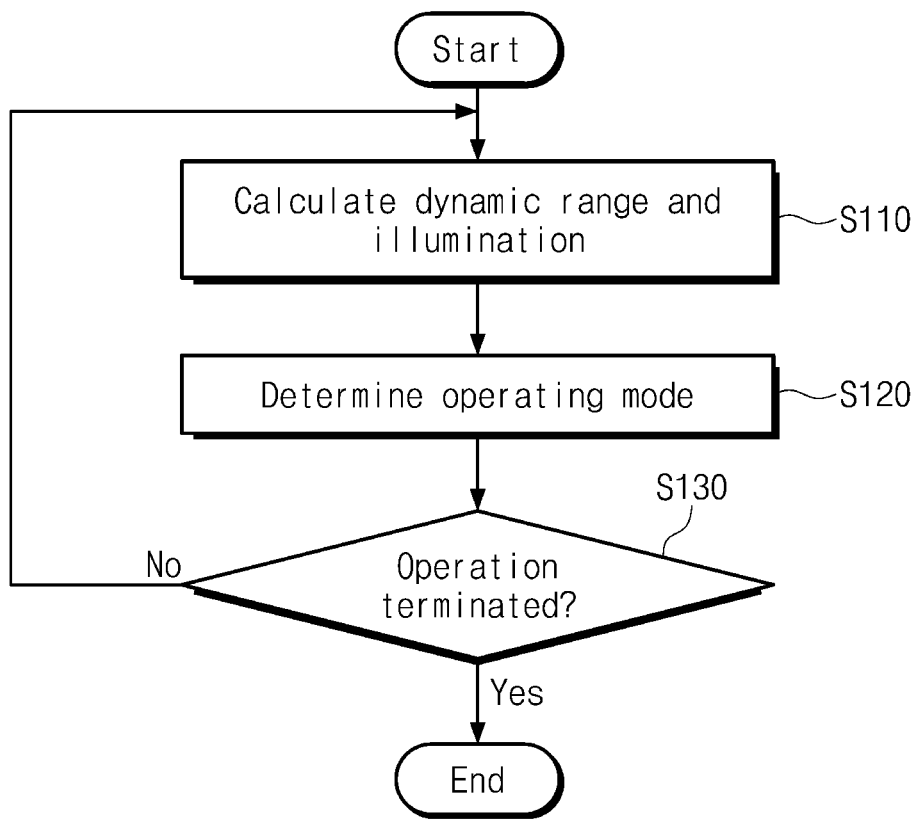
FIG. 5 is a flowchart of an operating method of the imaging system of FIG. 1.

FIG. 5 is a flowchart of an operating method of the imaging system of FIG. 1. Operations of FIG. 5 may be performed at the processing circuit 120 of FIG. 1, and may be understood as a method of setting an operating mode for HDR image processing. For convenience of description, FIG. 5 will be described with reference to reference marks/numerals of FIG. 1.

In operation S110, the processing circuit 120 or the dynamic range and illumination calculator 121 may calculate a dynamic range and an illumination of a frame based on the image data IDAT received from the image sensor 110. The dynamic range and the illumination may be used to determine whether to perform HDR image processing and a scheme to process an HDR image. As described above, the dynamic range may be calculated based on pixel values of the image data IDAT, and the illumination may be calculated based on the pixel values of the image data IDAT and an exposure time.

In operation S120, the processing circuit 120 or the mode controller 122 may determine an operating mode based on the calculated dynamic range and the calculated illumination. Whether to perform HDR processing on the image data IDAT may be determined based on the operating mode. The number of exposure times to be used to perform HDR processing on the image data IDAT may be determined based on the operating mode.

As described above, when the calculated dynamic range is greater than a first reference dynamic range and the calculated illumination is greater than a first reference illumination, the processing circuit 120 may select, as the operating mode, the first mode in which HDR image data are generated based on three different exposure times. The processing circuit 120 may provide the mode control signal MC corresponding to the first mode to the image sensor 110. Each sub-pixel of the image sensor 110 may convert a light, which is received during a specified exposure time of the three exposure times, into an electrical signal. The processing circuit 120 may perform corresponding HDR image processing on the image data IDAT generated based on the three exposure times.

Even though the calculated dynamic range and the calculated illumination do not correspond to the first mode, when the calculated dynamic range is greater than a second reference dynamic range and the calculated illumination is greater than a second reference illumination, the processing circuit 120 may select, as the operating mode, the second mode in which HDR image data are generated based on two different exposure times. Here, the second reference dynamic range may be smaller than the first reference dynamic range, and the second reference illumination may be smaller than the first reference illumination. The processing circuit 120 may provide the mode control signal MC corresponding to the second mode to the image sensor 110. Each sub-pixel of the image sensor 110 may convert a light, which is received during a specified exposure time of the two exposure times, into an electrical signal. The processing circuit 120 may perform corresponding HDR image processing on the image data IDAT generated based on the two exposure times.

Even though the calculated dynamic range and the calculated illumination do not correspond to the first and second modes, when the calculated dynamic range is greater than a third reference dynamic range and the calculated illumination is greater than a third reference illumination, the processing circuit 120 may select, as the operating mode, the third mode in which HDR image data are generated based on one exposure time. Here, the third reference dynamic range may be smaller than the second reference dynamic range, and the third reference illumination may be smaller than the second reference illumination. When the calculated dynamic range and the calculated illumination do not correspond to the first to third modes, the processing circuit 120 may select, as the operating mode, the fourth mode in which the HDR image is not generated. The above scheme to determine the operating mode is an example, and one or two of the first to fourth modes may not be provided.

In operation S130, the processing circuit 120 may determine whether an operation of the image sensor 110 is terminated. When it is determined that the operation of the image sensor 110 is terminated, the method may end; if not, the processing circuit 120 may repeatedly perform operation S110 and operation S120 until the operation of the image sensor 110 is terminated. The processing circuit 120 may change the operating mode in real time, based on the image data IDAT received from the image sensor 110. As such, an operating mode may be changed seamlessly without a frame drop or a latency.

Figure 6:
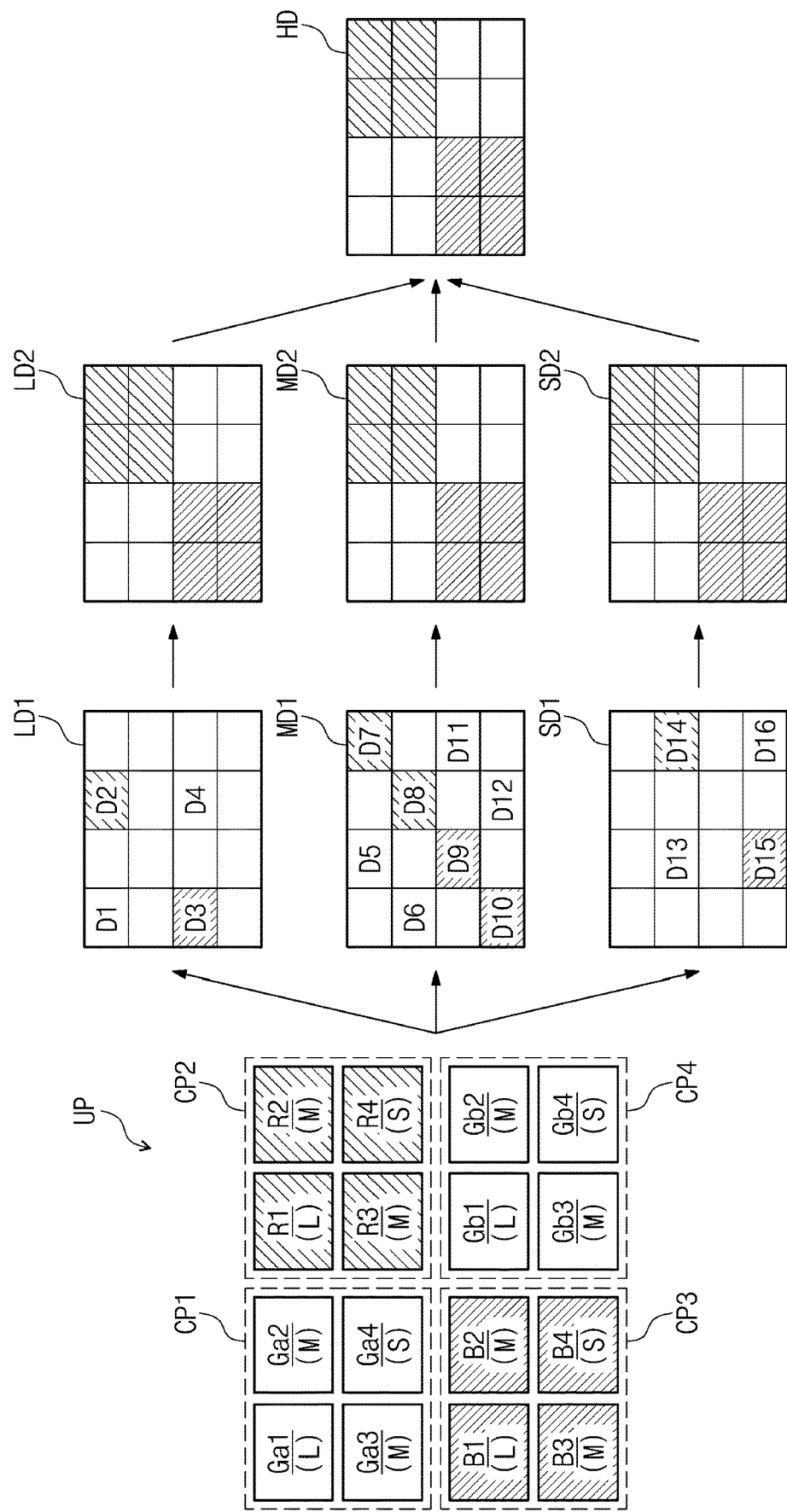
FIG. 6 is a diagram for describing a process of generating an HDR image in a first mode described with reference to FIGS. 1 to 5.

FIG. 6 is a diagram for describing a process of generating an HDR image in a first mode described with reference to FIGS. 1 to 5. The first mode may be understood as an operating mode for generating HDR image data based on three different exposure times. The first mode may be used in the case in which a dynamic range is great and an external illumination is great, such as a condition that a subject is dark due to a strong back light occurring with respect to the subject.

Referring to FIG. 6, each of sub-pixels included in the unit pixel UP converts a light, which is received during one exposure time of a long exposure time (e.g., a first exposure time), a middle exposure time (e.g., a second exposure time), and a short exposure time (e.g., a third exposure time), into an electrical signal. The driver circuit 112 of FIG. 2 may control exposure times of sub-pixels based on the mode control signal MC. As described above, the driver circuit 112 may control an exposure time by generating charge transmission signals to be applied to gates of transmission transistors based on the mode control signal MC. It is assumed that a configuration of the unit pixel UP of FIG. 5 is identical to the configuration of the unit pixel UP of FIG. 3.

Referring to the first unit color pixel CP1, the first sub-pixel Ga1 may generate an electrical signal during the first exposure time, each of the second sub-pixel Ga2 and the third sub-pixel Ga3 may generate an electrical signal during the second exposure time, and the fourth sub-pixel Ga4 may generate an electrical signal during the third exposure time. However, the embodiments are not limited thereto. For example, a sub-pixel corresponding to the first exposure time, a sub-pixel corresponding to the second exposure time, and a sub-pixel corresponding to the third exposure time may be different from the example illustrated in FIG. 6. Electrical signals generated by the sub-pixels may be converted into image data by the converting circuit 113 of FIG. 2.

The processing circuit 120 or the HDR image generator 123 of FIG. 1 may generate an HDR image HD in a scheme corresponding to an operating mode selected by the mode control signal MC. In this case, based on the mode control signal MC, the HDR image generator 123 of the processing circuit 120 may determine that image data are generated based on three exposure times. As such, the processing circuit 120 may separate three sub-images LD1, MD1, and SD1 from the image data based on exposure times. The first sub-image LD1 may include data values D1 to D4 corresponding to the first exposure time, the second sub-image MD1 may include data values D5 to D12 corresponding to the second exposure time, and the third sub-image SD1 may include data values D13 to D16 corresponding to the third exposure time. Unlike the above description in which image data are separated by the processing circuit 120, the image sensor 110 may output image data separated based on exposure times to the processing circuit 120.

The processing circuit 120 or the HDR image generator 123 may pre-process the first to third sub-images LD1, MD1, and SD1. For example, the first to third sub-images LD1, MD1, and SD1 may be interpolated to have the same number of values. As the interpolation result, first to third pre-processed sub-images LD2, MD2, and SD2 may have a Bayer pattern.

For example, weights that are determined based on exposure times and data values may be applied to the first to third pre-processed sub-images LD2, MD2, and SD2. For example, in a bright area, the first pre-processed sub-image LD2 may have a greater weight than the second and third pre-processed sub-images MD2 and SD2. Here, the bright area may be defined as an area in which pixel values of image data exceed a first reference value. The bright area may be an area in which pixel values corresponding to all the pixels included in the unit pixel exceed the first reference value to such an extent as to lose color information. For example, in a dark area, the third pre-processed sub-image SD2 may have a greater weight than the first and second pre-processed sub-images LD2 and MD2. Here, the dark area may be defined as an area in which pixel values of image data do not reach a second reference value. The dark area may be an area in which pixel values corresponding to all the pixels included in the unit pixel do not reach the second reference value to such an extent as to lose color information. The above pre-processing scheme may be an example, and various pre-processing schemes for expressing a clear, accurate image may be provided.

The processing circuit 120 or the HDR image generator 123 may merge (or combine) the first to third pre-processed sub-images LD2, MD2, and SD2 to generate the HDR image HD. According to a result of the pre-processing and combination (or merging), a data value of the third sub-image SD1 may be emphasized in the case of the dark area, and a data value of the first sub-image LD1 may be emphasized in the case of the bright area. Accordingly, the HDR image HD with an improved dynamic range may be generated. The above merging (or combination) scheme may be an example, and one or more of the first to third pre-processed sub-images LD2, MD2, and SD2 may be used to generate the HDR image HD.

Figure 7A:
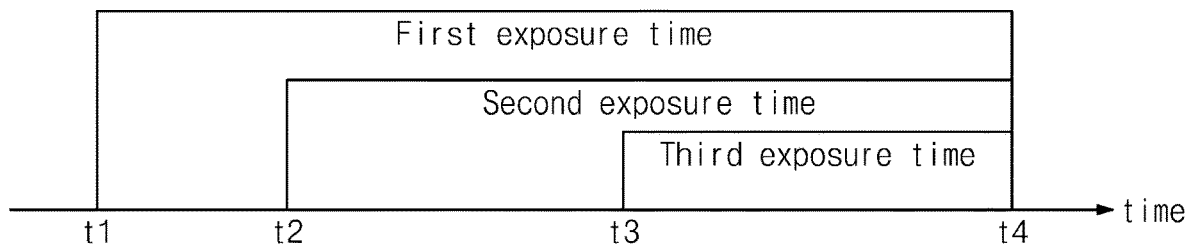
FIGS. 7A, 7B and 7C are graphs for describing exposure times in the first mode of FIG. 6.
Figure 7B:
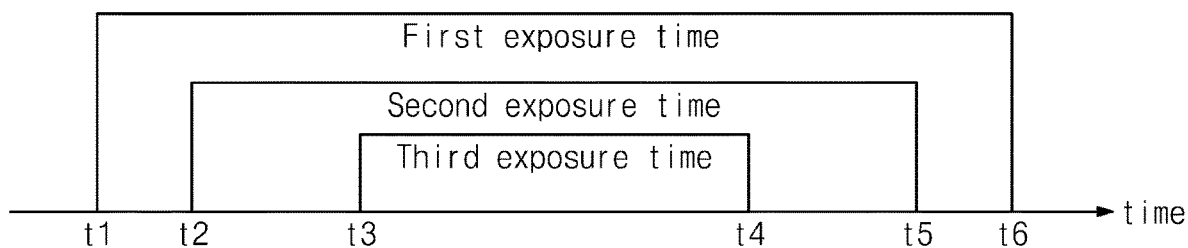
Figure 7C:
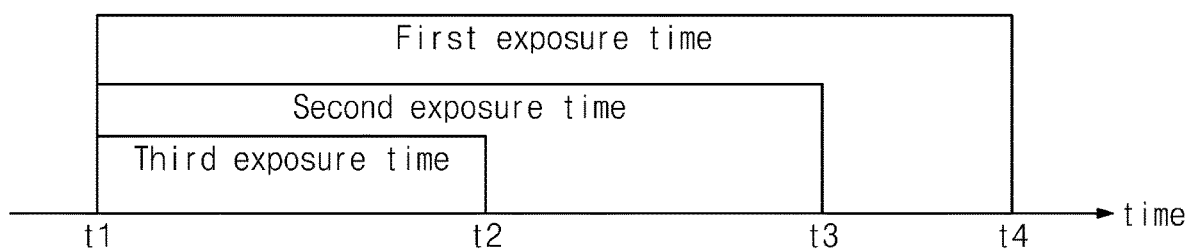

FIGS. 7A, 7B and 7C are graphs for describing exposure times in the first mode of FIG. 6. First to third exposure times are illustrated in FIGS. 7A to 7C. When an operating mode is determined as the first mode by the processing circuit 120 of FIG. 1, the mode control signal MC may be provided to the image sensor 110. The driver circuit 112 included in the image sensor 110 of FIG. 2 may control exposure times of sub-pixels based on the mode control signal MC. For example, exposure times of sub-pixels may be determined by controlling the transmission transistors TX1, TX2, TX3, and TX4 corresponding to the sub-pixels, respectively.

Referring to FIG. 7A, exposure times may be controlled with respect to an end time of the first to third exposure times. For convenience of description, an example is illustrated in FIG. 7A as the first to third exposure times have the same end time, but it may be understood that phases of exposure times respectively corresponding to sub-pixels are different depending on the order of scanning the sub-pixels. Pixels (e.g., the first sub-pixels Ga1, R1, B1, and Gb1 of FIG. 6) corresponding to the first exposure time may convert a light received during the first exposure time from a first time t1 to a fourth time t4 into electrical signals. Pixels (e.g., the second sub-pixels Ga2, R2, B2, and Gb2 and the third sub-pixels Ga3, R3, B3, and Gb3 of FIG. 6) corresponding to the second exposure time may convert a light received during the second exposure time from a second time t2 to the fourth time t4 into electrical signals. Pixels (e.g., the fourth sub-pixels Ga4, R4, B4, and Gb4 of FIG. 6) corresponding to the third exposure time may convert a light received during the third exposure time from a third time t3 to the fourth time t4 into electrical signals.

Referring to FIG. 7B, start times and end times of the first to third exposure times may be different. It may be understood that phases of exposure times corresponding to sub-pixels are different depending on the order of scanning the sub-pixels. Pixels corresponding to the first exposure time may convert a light received during the first exposure time from a first time t1 to a sixth time t6 into electrical signals. Pixels corresponding to the second exposure time may convert a light received during the second exposure time from a second time t2 to a fifth time t5 into electrical signals. Pixels corresponding to the third exposure time may convert a light received during the third exposure time from a third time t3 to a fourth time t4 into electrical signals.

Referring to FIG. 7C, exposure times may be controlled with respect to a start time of the first to third exposure times. For convenience of description, an example is illustrated in FIG. 7C as the first to third exposure times have the same start time, but it may be understood that phases of exposure times respectively corresponding to sub-pixels are different depending on the order of scanning the sub-pixels.

Pixels corresponding to the first exposure time may convert a light received during the first exposure time from a first time t1 to a fourth time t4 into electrical signals. Pixels corresponding to the second exposure time may convert a light received during the second exposure time from the first time t1 to a third time t3 into electrical signals. Pixels corresponding to the third exposure time may convert a light received during the third exposure time from the first time t1 to a second time t2 into electrical signals.

In addition, it is possible to control exposure times in various schemes. The driver circuit 112 of FIG. 2 may control an exposure time of each sub-pixel based on the mode control signal MC to be set to one of the first to third exposure times. As images of different exposure times are used to generate the HDR image, there may be generated an image in which a dynamic range is improved and the clearness is improved.

Figure 8:
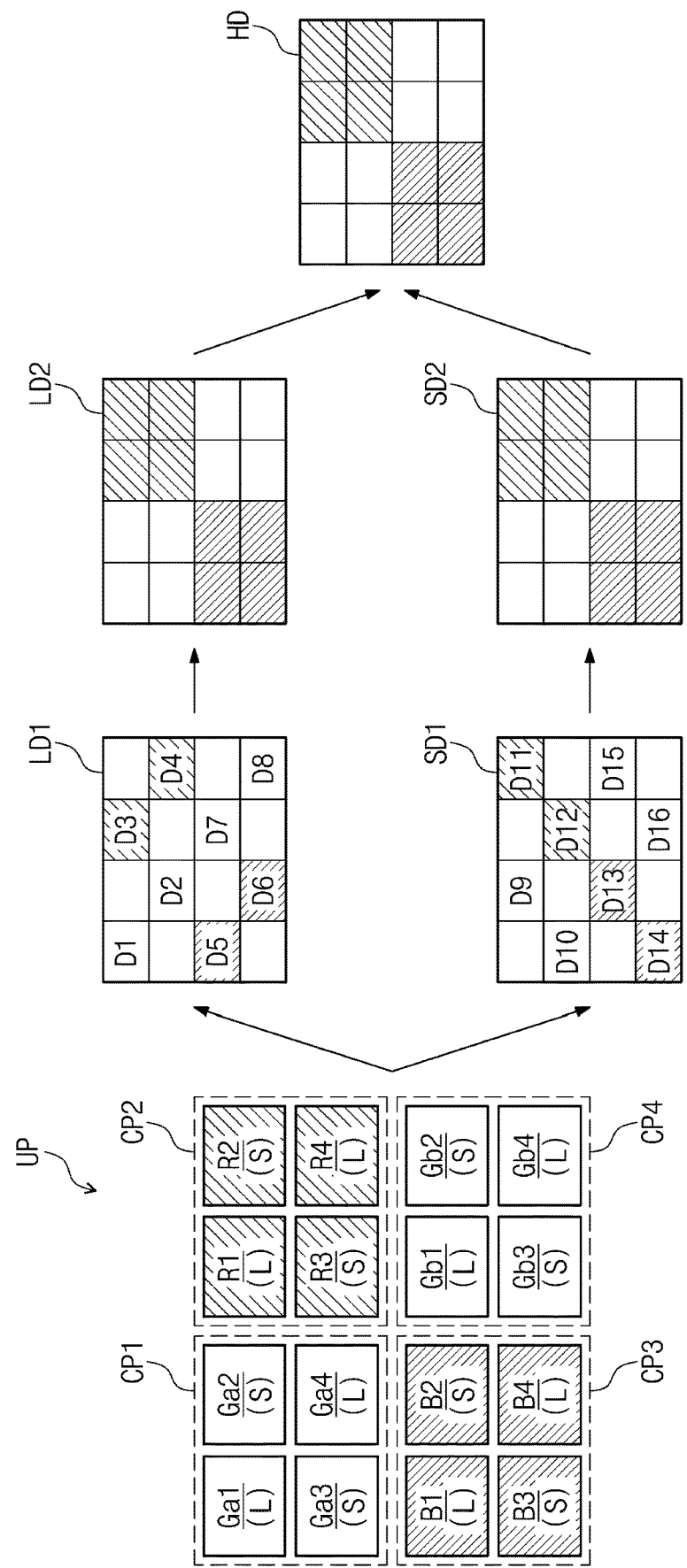
FIG. 8 is a diagram for describing a process of generating an HDR image in a second mode described with reference to FIGS. 1 to 5.

FIG. 8 is a diagram for describing a process of generating an HDR image in a second mode described with reference to FIGS. 1 to 5. The second mode may be understood as an operating mode for generating HDR image data based on two different exposure times. The second mode may be used to perform HDR image processing on image data having a smaller dynamic range than in the first mode.

Referring to FIG. 8, each of sub-pixels included in the unit pixel UP converts a light, which is received during one exposure time of a long exposure time (e.g., a first exposure time) and a short exposure time (e.g., a second exposure time), into an electrical signal. The driver circuit 112 of FIG. 2 may control exposure times of sub-pixels based on the mode control signal MC. As described above, the driver circuit 112 may control an exposure time by generating charge transmission signals to be applied to gates of transmission transistors based on the mode control signal MC. It is assumed that a configuration of the unit pixel UP of FIG. 8 is identical to the configuration of the unit pixel UP of FIG. 3.

For example, in the first unit color pixel CP1, each of the first sub-pixel Ga1 and the fourth sub-pixel Ga4 may generate an electrical signal during the first exposure time, and each of the second sub-pixel Ga2 and the third sub-pixel Ga3 may generate an electrical signal during the second exposure time. However, the embodiments are not limited thereto. For example, a sub-pixel corresponding to the first exposure time and a sub-pixel corresponding to the second exposure time may be different from the example illustrated in FIG. 6. Electrical signals generated by the sub-pixels may be converted into image data by the converting circuit 113 of FIG. 2.

The processing circuit 120 or the HDR image generator 123 of FIG. 1 may generate an HDR image HD in a scheme corresponding to an operating mode selected by the mode control signal MC. In this case, based on the mode control signal MC, the HDR image generator 123 of the processing circuit 120 may determine that image data are generated based on two exposure times. As such, the processing circuit 120 may separate two sub-images LD1 and SD1 from the image data based on exposure times. The first sub-image LD1 may include data values D1 to D8 corresponding to the first exposure time, and second sub-image SD1 may include data values D9 to D16 corresponding to the second exposure time. Unlike the above description in which image data are separated by the processing circuit 120, the image sensor 110 may output image data separated based on exposure times to the processing circuit 120.

The processing circuit 120 or the HDR image generator 123 may pre-process the first and second sub-images LD1 and SD1. As described with reference to FIG. 5, the first and second sub-images LD1 and SD1 may be interpolated, and weights that are determined based on exposure times and data values may be applied to first and second pre-processed sub-images LD2 and SD2. As the interpolation result, the first and second pre-processed sub-images LD2 and SD2 may have a Bayer pattern. However, the embodiments are not limited to the above pre-processing scheme, and various pre-processing schemes for expressing a clear, accurate image may be provided.

The processing circuit 120 or the HDR image generator 123 may merge (or combine) the first and second pre-processed sub-images LD2 and SD2 to generate the HDR image HD. According to a result of the pre-processing and combination (or merging), a data value of the second sub-image SD1 may be emphasized in the case of the dark area, and a data value of the first sub-image LD1 may be emphasized in the case of the bright area. Accordingly, the HDR image HD with an improved dynamic range may be generated.

Figure 9A:
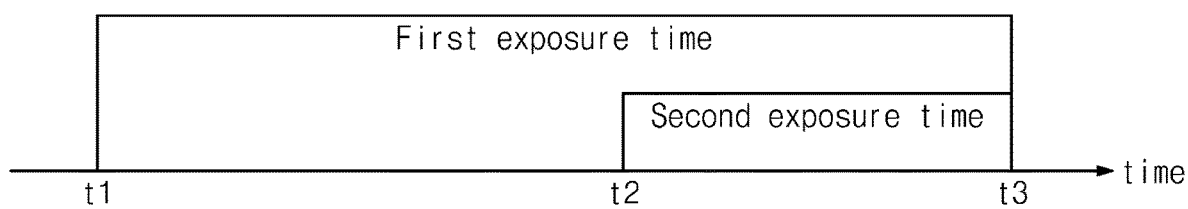
FIGS. 9A, 9B and 9C are graphs for describing exposure times in the second mode of FIG. 8.
Figure 9B:
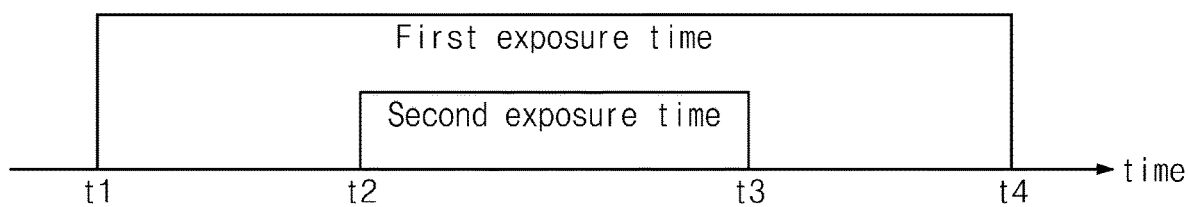
Figure 9C:
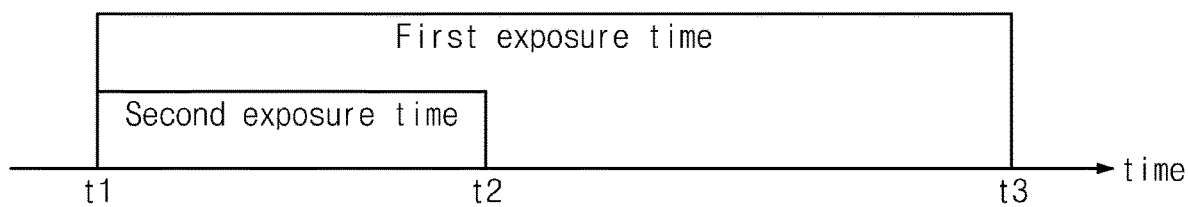

FIGS. 9A, 9B and 9C are graphs for describing exposure times in the second mode of FIG. 8. First and second exposure times are illustrated in FIGS. 9A to 9C. When an operating mode is determined as the second mode by the processing circuit 120 of FIG. 1, the mode control signal MC may be provided to the image sensor 110. The driver circuit 112 included in the image sensor 110 of FIG. 2 may control exposure times of sub-pixels based on the mode control signal MC. For example, exposure times of sub-pixels may be determined by controlling the transmission transistors TX1, TX2, TX3, and TX4 corresponding to the sub-pixels, respectively.

Referring to FIG. 9A, exposure times may be controlled with respect to an end time of the first and second exposure times. It may be understood that phases of exposure times corresponding to sub-pixels are different depending on the order of scanning the sub-pixels. Pixels (e.g., the first sub-pixels Ga1, R1, B1, and Gb1 and the fourth sub-pixels Ga4, R4, B4, and Gb4 of FIG. 8) corresponding to the first exposure time may convert a light received during the first exposure time from a first time t1 to a third time t3 into electrical signals. Pixels (e.g., the second sub-pixels Ga2, R2, B2, and Gb2 and the third sub-pixels Ga3, R3, B3, and Gb3 of FIG. 8) corresponding to the second exposure time may convert a light received during the second exposure time from a second time t2 to the third time t3 into electrical signals.

Referring to FIG. 9B, start times and end times of the first and second exposure times may be different. It may be understood that phases of exposure times corresponding to sub-pixels are different depending on the order of scanning the sub-pixels. Pixels corresponding to the first exposure time may convert a light received during the first exposure time from a first time t1 to a fourth time t4 into electrical signals. Pixels corresponding to the second exposure time may convert a light received during the second exposure time from a second time t2 to a third time t3 into electrical signals.

Referring to FIG. 9C, exposure times may be controlled with respect to a start time of the first and second exposure times. It may be understood that phases of exposure times corresponding to sub-pixels are different depending on the order of scanning the sub-pixels. Pixels corresponding to the first exposure time may convert a light received during the first exposure time from a first time t1 to a third time t3 into electrical signals. Pixels corresponding to the second exposure time may convert a light received during the second exposure time from the first time t1 to a second time t2 into electrical signals.

In addition, it is possible to control exposure times in various schemes. The driver circuit 112 of FIG. 2 may control an exposure time of each sub-pixel based on the mode control signal MC to be set to one of the first and second exposure times. As images of different exposure times are used to generate the HDR image, there may be generated an image in which a dynamic range is improved and the clearness is improved.

Figure 10:
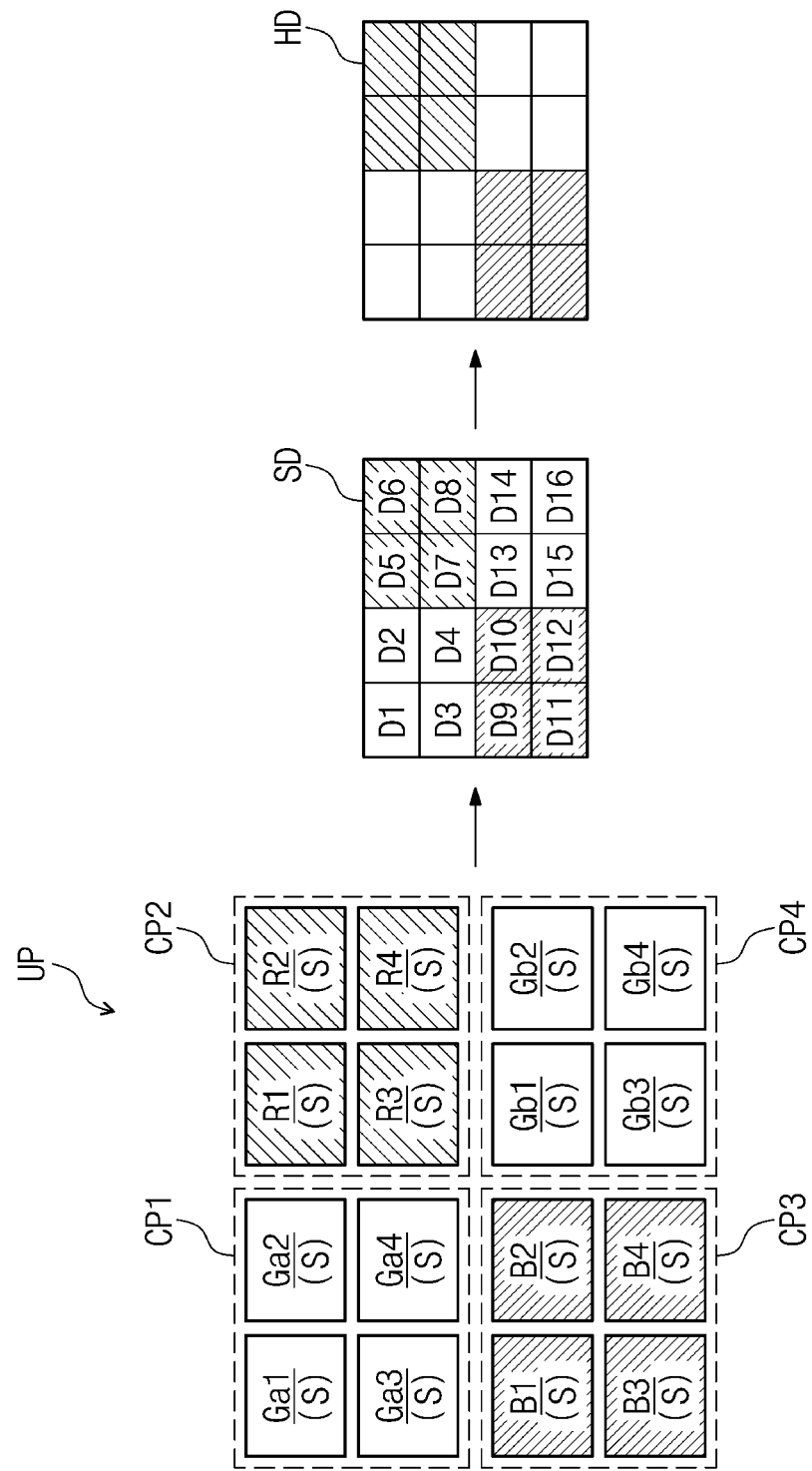
FIG. 10 is a diagram for describing a process of generating an HDR image in a third mode described with reference to FIGS. 1 to 5.

FIG. 10 is a diagram for describing a process of generating an HDR image in a third mode described with reference to FIGS. 1 to 5. The third mode may be understood as an operating mode for generating HDR image data based on one exposure time. The third mode may be used to perform HDR image processing on image data having a smaller dynamic range than in the first and second modes.

Referring to FIG. 10, each of sub-pixels included in the unit pixel UP converts a light, received during one exposure time into an electrical signal. For example, the one exposure time may be a short exposure time of FIG. 6 or 8, but the embodiments are not limited thereto. For example, the one exposure time may be different from the short exposure time of FIG. 6 or 8. The driver circuit 112 of FIG. 2 may control exposure times of sub-pixels based on the mode control signal MC. As described above, the driver circuit 112 may control an exposure time by generating charge transmission signals to be applied to gates of transmission transistors based on the mode control signal MC. It is assumed that a configuration of the unit pixel UP of FIG. 10 is identical to the configuration of the unit pixel UP of FIG. 3. Electrical signals generated by the sub-pixels may be converted into image data by the converting circuit 113 of FIG. 2.

The processing circuit 120 or the HDR image generator 123 of FIG. 1 may generate the HDR image HD in a scheme corresponding to an operating mode selected by the mode control signal MC. In this case, through the mode control signal MC, the processing circuit 120 may determine that image data are generated based on one exposure time. The processing circuit 120 may perform HDR image processing on one image SD without separation of image data. The image SD may include data values D1 to D16 corresponding to one exposure time.

An example is illustrated in FIG. 10 as the image SD include the data values D1 to D16 respectively corresponding to sub-pixels, but the embodiments are not limited thereto. For example, in the case in which the converting circuit 113 of FIG. 2 performs analog binning on electrical signals in the unit of unit color pixel or the converting circuit 113 or the processing circuit 120 performs digital binning on digital values in the unit of unit color pixel, the number of data values included in the image SD may decrease.

The processing circuit 120 or the HDR image generator 123 of FIG. 1 may generate the HDR image HD based on the image SD. For example, the processing circuit 120 or the HDR image generator 123 may perform tone mapping processing on the image SD. However, the embodiments are not limited thereto, and various image processing schemes for expressing a clear, accurate image may be provided. Because the HDR image HD is generated by using the one image SD in the third mode, the power consumption of the imaging system 100 may decrease compared to the case in which an HDR image is generated in the first and second modes.

Figure 11:
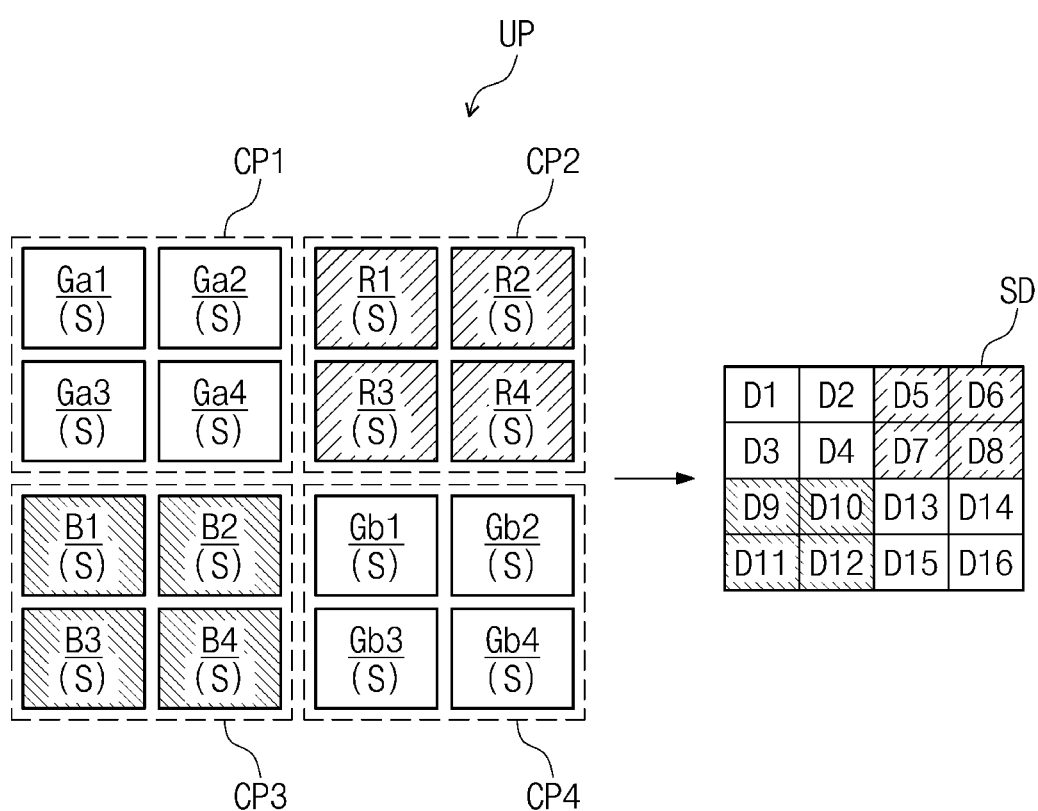
FIG. 11 is a diagram for describing a process of generating an HDR image in a fourth mode described with reference to FIGS. 1 to 5.

FIG. 11 is a diagram for describing a process of generating an HDR image in a fourth mode described with reference to FIGS. 1 to 5. The fourth mode may be understood as an operating mode in which HDR image data are not required due to a small dynamic range of image data.

Referring to FIG. 11, each of sub-pixels included in the unit pixel UP converts a light, received during one exposure time into an electrical signal. For example, the one exposure time may be a short exposure time of FIG. 6 or 8, but the embodiments are not limited thereto. For example, the one exposure time may be different from the short exposure time of FIG. 6 or 8. The driver circuit 112 of FIG. 2 may control exposure times of sub-pixels based on the mode control signal MC. It is assumed that a configuration of the unit pixel UP of FIG. 11 is identical to the configuration of the unit pixel UP of FIG. 3. Electrical signals generated by the sub-pixels may be converted into image data by the converting circuit 113 of FIG. 2.

The image SD provided from the image sensor 110 may include the data values D1 to D16 corresponding to one exposure time. An example is illustrated in FIG. 11 as the image SD include the data values D1 to D16 respectively corresponding to sub-pixels, but the embodiments are not limited thereto. For example, in the case in which the converting circuit 113 of FIG. 2 performs analog binning on electrical signals in the unit of unit color pixel or the converting circuit 113 or the processing circuit 120 performs digital binning on digital values in the unit of unit color pixel, the number of data values included in the image SD may decrease.

The processing circuit 120 or the HDR image generator 123 of FIG. 1 may not perform HDR image processing based on the mode control signal MC. The processing circuit 120 or the HDR image generator 123 may not perform tone mapping processing on the image SD. In the fourth mode, because an operation of the HDR image generator 123 is not performed, power consumption of the imaging system 100 may decrease.

FIGS. 12, 13, 14 and 15 are flowcharts of an operating method of the imaging system of FIG. 1. Operations of FIG. 12 may be performed at the processing circuit 120 of FIG. 1, and may be understood as a method of setting an operating mode for HDR image processing. For convenience of description, FIG. 12 will be described with reference to reference marks/numerals of FIG. 1.

In operation S210, the processing circuit 120 or the dynamic range and illumination calculator 121 may calculate a dynamic range and an illumination of a frame based on the image data IDAT received from the image sensor 110. Operation S210 corresponds to operation S110 of FIG. 5. It may be understood that operation S221 to operation S227 that constitute an operation of determining an operating mode are included in operation S120 of FIG. 5.

In operation S221, the processing circuit 120 or the mode controller 122 may determine whether the calculated dynamic range and the calculated illumination belong to a first reference range. The first reference range may be a condition for generating an HDR image based on three different exposure times. The first reference range may have a first reference dynamic range for comparison with the calculated dynamic range as a lower limit and may have a first reference illumination for comparison with the calculated illumination as a lower limit. Here, the first reference dynamic range and the first reference illumination may correspond to the first reference dynamic range and the first reference illumination described with reference to FIG. 5.

When the calculated dynamic range and the calculated illumination are within the first reference range, operation S222 is performed. In operation S222, the processing circuit

120 may generate the mode control signal MC corresponding to the first mode. Each sub-pixel of the image sensor 110 may convert a light, which is received during a specified exposure time of the three exposure times, into an electrical signal, based on the mode control signal MC. The processing circuit 120 may perform corresponding HDR image processing on the image data IDAT generated based on the three exposure times.

When the calculated dynamic range and the calculated illumination are out of the first reference range, operation S223 is performed. In operation S223, the processing circuit 120 or the mode controller 122 may determine whether the calculated dynamic range and the calculated illumination belong to a second reference range. The second reference range may be a condition for generating an HDR image based on two different exposure times. The second reference range may have a second reference dynamic range for comparison with the calculated dynamic range as a lower limit and may have a second reference illumination for comparison with the calculated illumination as a lower limit. Here, the second reference dynamic range and the second reference illumination may correspond to the second reference dynamic range and the second reference illumination described with reference to FIG. 5.

When the calculated dynamic range and the calculated illumination are within the second reference range, operation S224 is performed. In operation S224, the processing circuit 120 may generate the mode control signal MC corresponding to the second mode. Each sub-pixel of the image sensor 110 may convert a light, which is received during a specified exposure time of the two exposure times, into an electrical signal, based on the mode control signal MC. The processing circuit 120 may perform corresponding HDR image processing on the image data DAT generated based on the two exposure times.

When the calculated dynamic range and the calculated illumination are out of the second reference range, operation S225 is performed. In operation S225, the processing circuit 120 or the mode controller 122 may determine whether the calculated dynamic range and the calculated illumination belong to a third reference range. The third reference range may be a condition for generating an HDR image based on one exposure time. The third reference range may have a third reference dynamic range for comparison with the calculated dynamic range as a lower limit and may have a third reference illumination for comparison with the calculated illumination as a lower limit. Here, the third reference dynamic range and the third reference illumination may correspond to the third reference dynamic range and the third reference illumination described with reference to FIG. 5.

When the calculated dynamic range and the calculated illumination are within the third reference range, operation S226 is performed. In operation S226, the processing circuit 120 may generate the mode control signal MC corresponding to the third mode. Each sub-pixel of the image sensor 110 may convert a light, which is received during the one exposure time, into an electrical signal, based on the mode control signal MC. The processing circuit 120 may perform corresponding HDR image processing on the image data DAT generated based on the one exposure time.

When the calculated dynamic range and the calculated illumination are out of the third reference range, operation S227 is performed. In operation S227, the processing circuit 120 may generate the mode control signal MC corresponding to the fourth mode. Each sub-pixel of the image sensor 110 may convert a light, which is received during the one exposure time, into an electrical signal, based on the mode control signal MC. The processing circuit 120 may not perform HDR image processing.

Through operation S221 to operation S227, the imaging system 100 may select an HDR processing scheme corresponding to an external condition and may determine whether the HDR processing scheme is unnecessary. Accordingly, image processing that is adaptive to an external condition is possible. Unnecessary power consumption due to a fixed HDR processing scheme may decrease.

In operation S230, the processing circuit 120 may determine whether an operation of the image sensor 110 is terminated. When it is determined that the operation of the image sensor 110 is terminated, the method may end; if not, the processing circuit 120 may repeatedly perform operation S210 and operation S227 until the operation of the image sensor 110 is terminated. Operation S230 may correspond to operation S130. Because the processing circuit 120 changes an operating mode in real time depending on an external condition, an operating mode is seamlessly changed.

Figure 12:
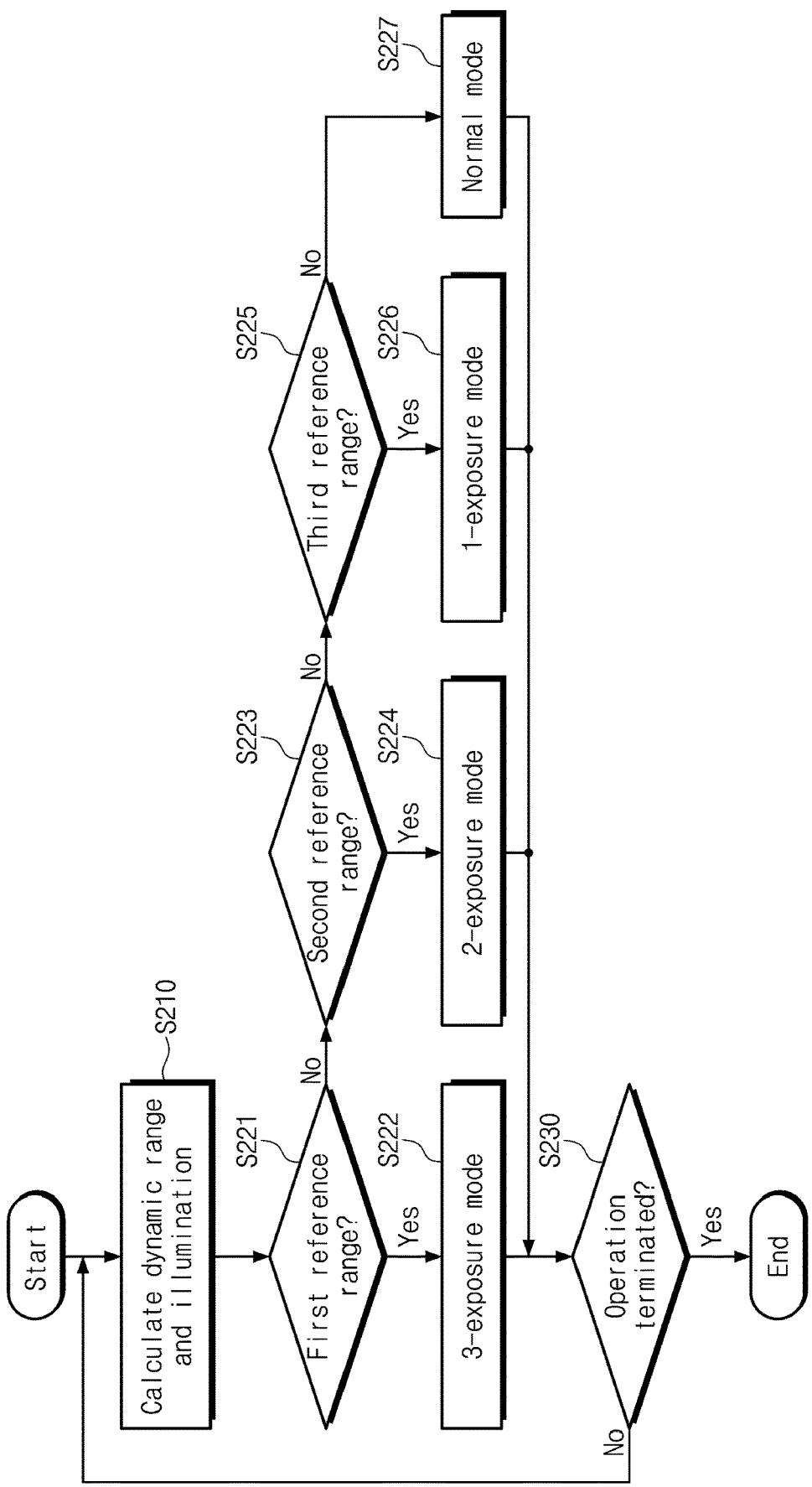
FIGS. 12, 13, 14 and 15 are flowcharts of an operating method of the imaging system of FIG. 1.
Figure 13:
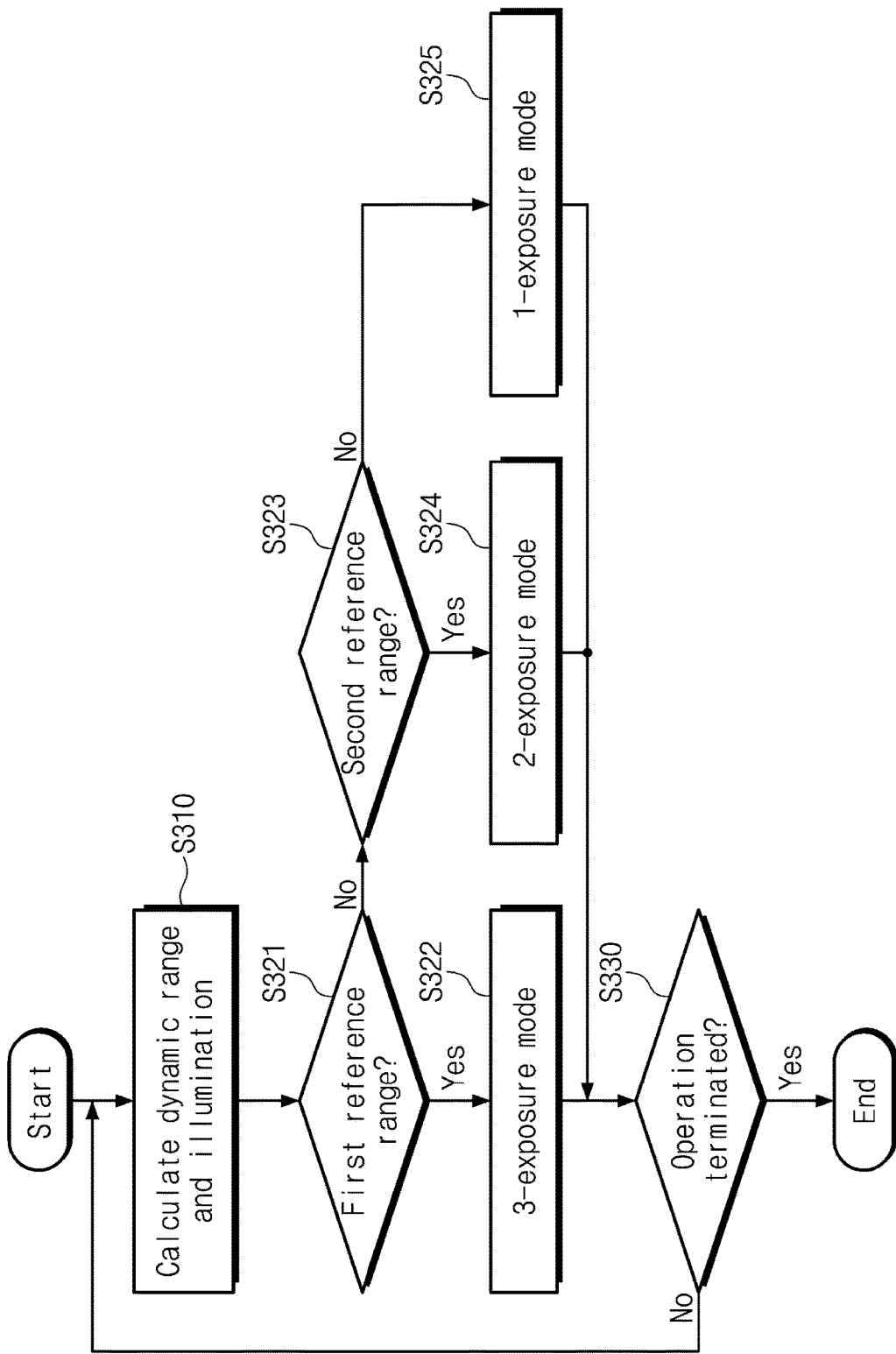
Figure 14:
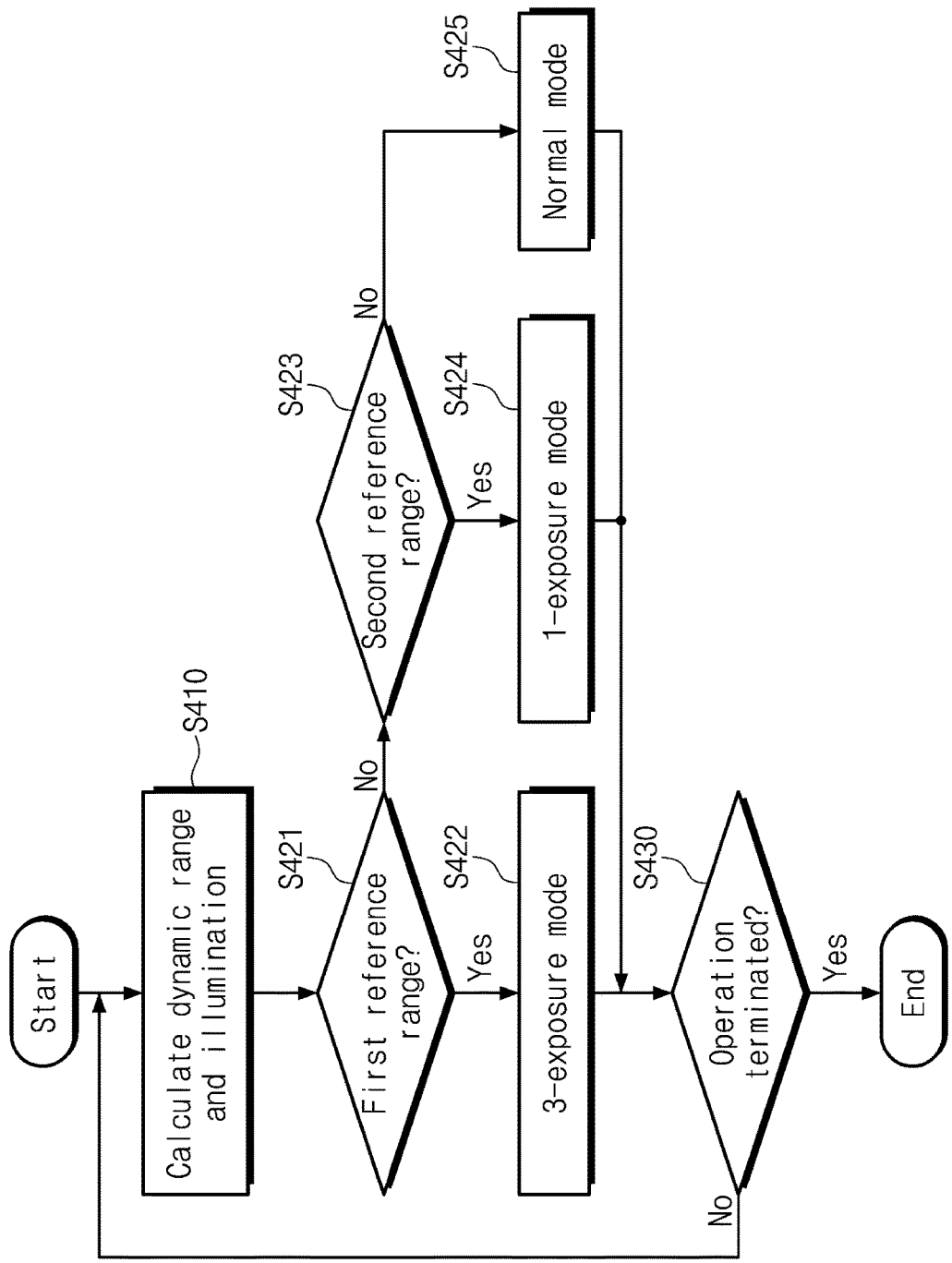
Figure 15:
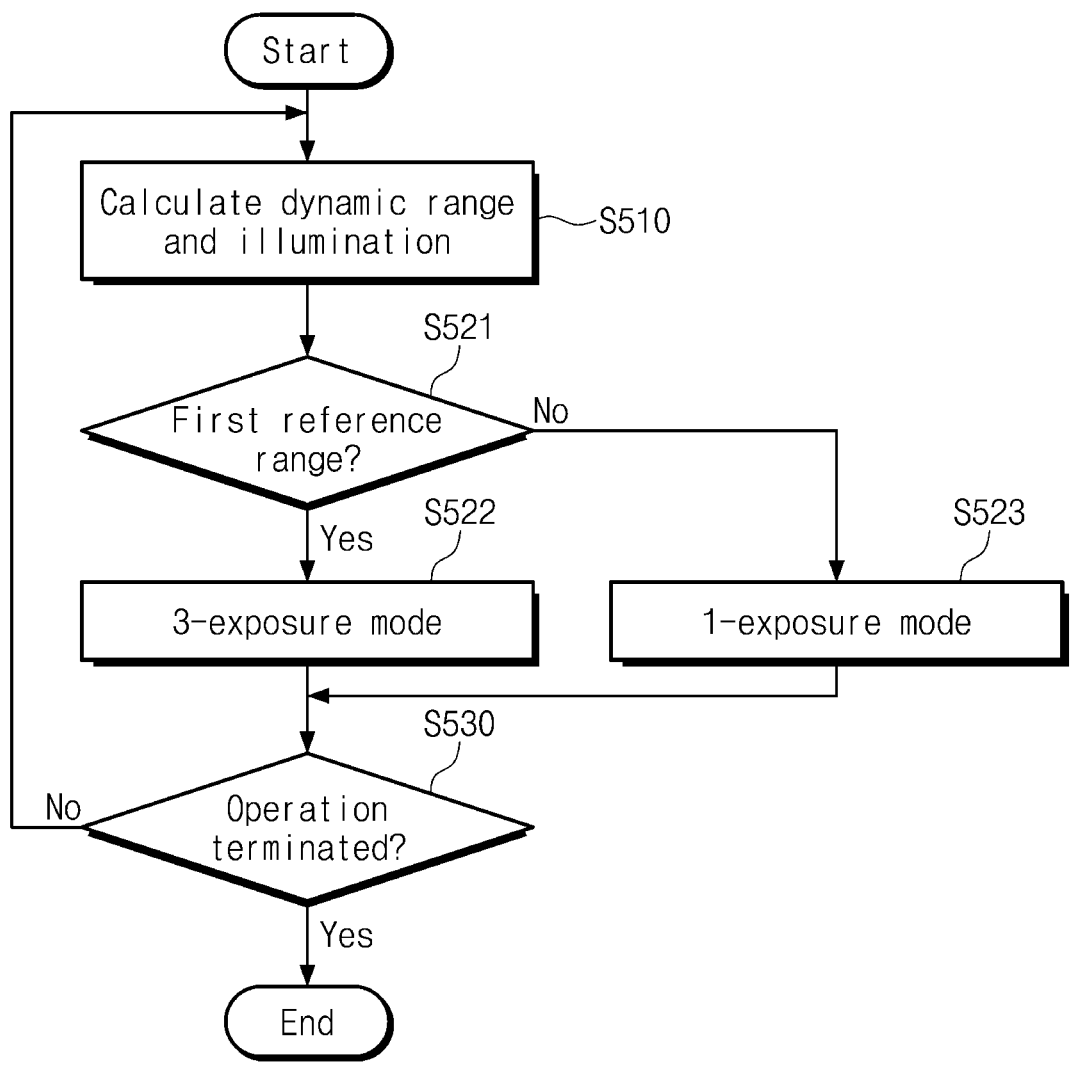

Referring to FIGS. 13 to 15, operations of FIGS. 13 to 15 may be performed at the processing circuit 120 of FIG. 1. The description will be focused on a difference between operations of FIG. 12 and operations of FIGS. 13 to 15. For convenience of description, FIGS. 13 to 15 will be described with reference to reference numerals/marks of FIG. 1.

Referring to FIG. 13, operation S310, operation S321 to operation S325, and operation S330 correspond to operation S210, operation S221 to operation S224, operation S226, and operation S230 of FIG. 12. Unlike the description given with reference to FIG. 12, the mode controller 122 may determine one of three operating modes. Unlike the description given with reference to FIG. 12, the mode controller 122 may not determine a normal mode that is an operating mode corresponding to the fourth mode. That is, the mode controller 122 may omit the operation of determining whether HDR image processing is unnecessary and may change an operating mode in real time. In this case, an operation corresponding to operation S225 of FIG. 12, that is, an operation in which a dynamic range and an illumination are within the third reference range may be omitted.

Referring to FIG. 14, operation S410, operation S421 to operation S425, and operation S430 correspond to operation S210, operation S221, operation S222, operation S225 to operation S227, and operation S230 of FIG. 12. Unlike the description given with reference to FIG. 12, the mode controller 122 may determine one of three operating modes. Unlike the description given with reference to FIG. 12, the mode controller 122 may not determine an operating mode corresponding to the second mode. That is, the mode controller 122 may not perform HDR image processing that is based on two exposure times.

Referring to FIG. 15, operation S510, operation S521 to operation S523, and operation S530 correspond to operation S210, operation S221, operation S222, operation S227, and operation S230 of FIG. 12. Unlike the description given with reference to FIG. 12, the mode controller 122 may determine one of two operating modes. Unlike the description given with reference to FIG. 12, the mode controller 122 may not determine operating modes corresponding to the second mode and the fourth mode and may select one of two HDR image processing schemes.

In addition, it is possible to select various schemes of operating modes. The mode controller 122 may be configured to select one of two or third modes of the first to fourth modes. Also, the mode controller 122 may additionally perform an operating mode in which HDR image processing is performed based on four exposure times. For example, the mode controller 122 may classify an external environment as the low-illumination environment or the high-illumination environment described above and may further determine an operating mode (e.g., a high-illumination mode) in which electrical signals are output in the unit of sub-pixel and an operating mode (e.g., a low-illumination mode) in which electrical signals are output in the unit of unit color pixel. The switch between operation modes, the number of which is set as described above, may be made in real time based on the dynamic range and the illumination.

Figure 16:
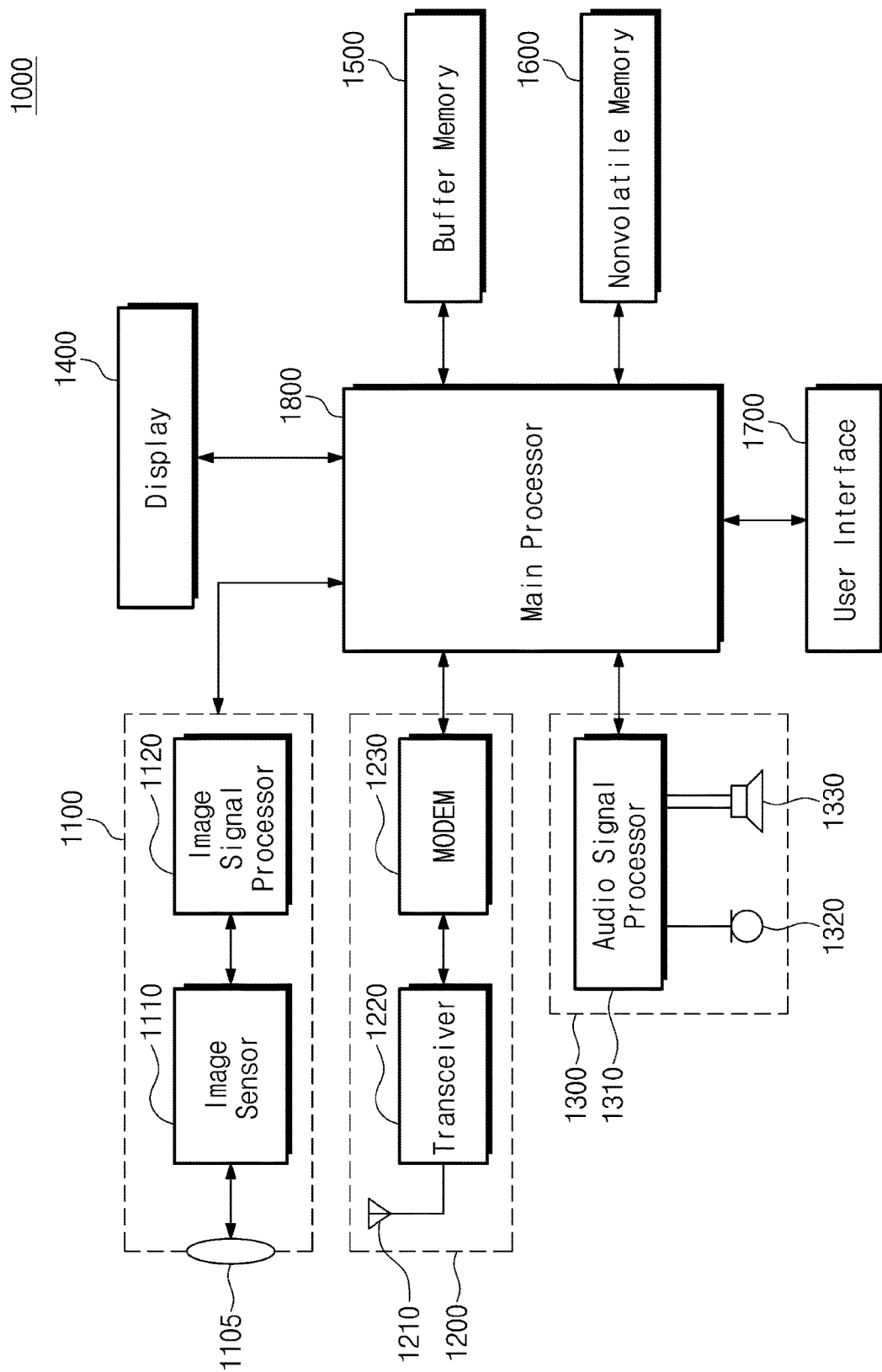
FIG. 16 is a block diagram of an electronic system to which the imaging system of FIG. 1 is applied.

FIG. 16 is a block diagram of an electronic system to which the imaging system of FIG. 1 is applied. Referring to FIG. 16, an electronic system 1000 may be variously implemented with a desktop computer, a laptop computer, a tablet computer, a smartphone, a wearable device, or an electric vehicle. The electronic system 1000 may include an imaging system 1100, a communication system 1200, an audio processing system 1300, a display system 1400, a buffer memory 1500, a nonvolatile memory 1600, a user interface 1700, and a main processor 1800.

The imaging system 1100 may receive a light through a lens 1105. An image sensor 1110 and an image signal processor 1120 included in the imaging system 1100 may generate image data based on the received light. The image sensor 1110 may include the function of the image sensor 110 described with reference to FIGS. 1 to 14. For example, the image sensor 1110 may obtain image data based on exposure times that are determined based on an operating mode.

The image signal processor 1120 may include the function of the processing circuit 120 described with reference to FIGS. 1 to 14. For example, the image signal processor 1120 may calculate a dynamic range and an illumination based on image data and may determine an operating mode based on the calculated dynamic range and the calculated illumination. The image signal processor 1120 may perform HDR image processing on image data that are generated based on the operating mode.

The communication system 1200 may exchange signals with an external device/system through an antenna 1210. A transceiver 1220 and a MODEM (Modulator/Demodulator) 1230 of the communication system 1200 may process signals, which are exchanged with the external device/system, in compliance with various wireless communication protocols.

The audio processing system 1300 may process sound information by using an audio signal processor 1310, thus playing and outputting audio. The audio processing system 1300 may receive an audio input through a microphone 1320. The audio processing system 1300 may output the reproduced audio through a speaker 1330.

The display system 1400 may receive data from an external device (e.g., the main processor 1800) and may display an image through a display panel based on the receive data. For example, the display system 1400 may display the HDR image generated from the image signal processor 1120.

The buffer memory 1500 may store data to be used for an operation of the electronic system 1000. In embodiments, the buffer memory 1500 may temporarily store data processed or to be processed by the main processor 1800. In embodiments, the buffer memory 1500 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1600 may store data regardless of power supply. In embodiments, the nonvolatile memory 1600 may include any one or any combination of various nonvolatile memories such as a flash memory, a PRAM, an MRAM, a ReRAM, and a FRAM. In embodiments, the nonvolatile memory 1600 may include a removable memory such as a secure digital (SD) card, and/or an embedded memory such as an embedded multimedia card (eMMC).

The user interface 1700 may perform communication arbitration between a user and the electronic system 1000. In embodiments, the user interface 1700 may include input interfaces such as a keypad, a button, a touch screen, a touch pad, a gyroscope sensor, a vibration sensor, and an acceleration sensor. In embodiments, the user interface 1700 may include output interfaces such as a motor and a LED lamp.

The main processor 1800 may control overall operations of the components of the electronic system 1000. The main processor 1800 may process various operations for the purpose of operating the electronic system 1000. For example, the main processor 1800 may be implemented with an operation processing device/circuit, which includes one or more processor cores, such as a general-purpose processor, a special-purpose processor, an application processor, or a microprocessor. Unlike the above description, at least one (e.g., the mode controller 122) of functional blocks (or intellectual properties) included in the processing circuit 120 of FIG. 1 may be implemented in the main processor 1800, not the image signal processor 1120.

An imaging system for generating an HDR image according to embodiments may adaptively control an operating mode depending on a condition corresponding to an image, thus reducing power consumption and improving the performance of the imaging system. Also, the imaging system for generating an HDR image according to embodiments may change an operating mode in real time depending on a condition corresponding to an image in a state in which the change of the operating mode is not perceived by the user.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been described with reference to the embodiments thereof, it will be apparent to those of ordinary skill in the art that various changes and modifications may be made thereto without departing from the spirit and scope of the inventive concept as set forth in the following claims.

What is claimed is:

1. An imaging system comprising:
an image sensor configured to obtain first image data, based on a received light; and
a processing circuit configured to determine an operating mode of the image sensor, among a first mode and a second mode, based on an illumination and a dynamic range corresponding to the obtained first image data,
wherein the image sensor comprises:
a first sub-pixel configured to:
sense a target light corresponding to a target color;
in the first mode, convert the target light sensed during a first exposure time, into a first signal; and
in the second mode, convert the target light sensed during a second exposure time longer than the first exposure time, into a second signal;
a second sub-pixel sharing a floating diffusion area with the first sub-pixel, and configured to:
sense the target light;
in the first mode, convert the target light sensed during the first exposure time into a third signal; and
in the second mode, convert the target light sensed during the second exposure time into a fourth signal; and
a converting circuit configured to:
obtain second image data, based on the first signal and the third signal into which the target light is converted in the first mode; and
obtain third image data, based on the second signal and the fourth signal into which the target light is converted in the second mode.

2. The imaging system of claim 1, wherein the processing circuit is further configured to:
based on the illumination being greater than a first threshold and the dynamic range being greater than a second threshold, determine the operating mode as the second mode; and
based on the illumination being less than or equal to the first threshold or the dynamic range being less than or equal to the second threshold, determine the operating mode as the first mode.

3. The imaging system of claim 1, wherein the processing circuit is further configured to:
obtain the illumination, based on a plurality of values of the obtained first image data and a plurality of exposure times of a plurality of sub-pixels respectively corresponding to the plurality of values; and
obtain the dynamic range, based on a maximum value and a minimum value of the plurality of values.

4. The imaging system of claim 1, wherein the processing circuit is further configured to:
divide the obtained third image data into a first value corresponding to the first sub-pixel and a second value corresponding to the second sub-pixel;
obtain a first sub-image, based on the first value into which the third image data is divided;
obtain a second sub-image, based on the second value into which the third image data is divided; and
obtain a high dynamic range (HDR) image, based on the obtained first sub-image and the obtained second sub-image.

5. The imaging system of claim 1, wherein the processing circuit is further configured to perform tone mapping on the obtained second image data to obtain a high dynamic range (HDR) image.

6. The imaging system of claim 1, wherein the image sensor further comprises:
a third sub-pixel sharing the floating diffusion area with the first sub-pixel and the second sub-pixel, and configured to:
sense the target light;
in the first mode, convert the target light sensed during the first exposure time into a fifth signal; and
in the second mode, convert the target light sensed during a third exposure time longer than the first exposure time and shorter than the second exposure time, into a sixth signal,
wherein the converting circuit is further configured to:
obtain the second image data, further based on the fifth signal into which the target light is converted in the first mode; and
obtain the third image data, further based on the sixth signal into which the target light is converted in the second mode.

7. The imaging system of claim 6, wherein the operating mode is determined further among a third mode,
wherein at least one among the first sub-pixel, the second sub-pixel, and the third sub-pixel is further configured to, in the third mode, convert the target light sensed during the first exposure time into a seventh signal,
wherein a remaining one among the first sub-pixel, the second sub-pixel and the third sub-pixel other than the at least one among the first sub-pixel, the second sub-pixel, and the third sub-pixel is further configured to, in the third mode, convert the target light sensed during the second exposure time into an eighth signal, and
wherein the converting circuit is further configured to obtain fourth image data, based on the seventh signal and the eighth signal into which the target light is converted in the third mode.

8. The imaging system of claim 7, wherein the processing circuit is further configured to:
based on each of the illumination and the dynamic range being within a first reference range, determine the operating mode as the second mode;
based on the illumination or the dynamic range being within a second reference range less than the first reference range, determine the operating mode as the third mode; and
based on the illumination or the dynamic range being less than the second reference range, determine the operating mode as the first mode.

9. The imaging system of claim 6, wherein the processing circuit is further configured to:
divide the third image data into a first value corresponding to the first sub-pixel, a second value corresponding to the second sub-pixel, and a third value corresponding to the third sub-pixel;
obtain a first sub-image, based on the first value into which the third image data is divided;
obtain a second sub-image, based on the second value into which the third image data is divided;
obtain a third sub-image, based on the third value into which the third image data is divided; and obtain a high dynamic range (HDR) image, based on the obtained first sub-image, the obtained second sub-image and the obtained third sub-image.

10. The imaging system of claim 1, wherein the operating mode is determined further among a third mode,
wherein each of the first sub-pixel and the second sub-pixel is further configured to, in the third mode, convert the target light sensed during the first exposure time into a fifth signal,
wherein the converting circuit is further configured to obtain fourth image data, based on the fifth signal into which the target light is converted in the third mode, and
wherein the processing circuit is further configured to:
in the first mode, obtain a high dynamic range (HDR) image, based on the obtained second image data in the first mode,
in the second mode, obtain the HDR image, based on the obtained third image data; and
in the third mode, refrain from obtaining the HDR image that is based on the fourth image data.

11. The imaging system of claim 10, wherein the processing circuit is further configured to:
based on each of the illumination and the dynamic range being within a first reference range, determine the operating mode as the second mode;
based on the illumination or the dynamic range being within a second reference range less than the first reference range, determine the operating mode as the first mode; and
based on the illumination or the dynamic range being less than the second reference range, determine the operating mode as the third mode.

12. An imaging system comprising:
an image sensor comprising:
a pixel array that comprises a plurality of sub-pixels, each of the plurality of sub-pixels generating an electrical signal based on a received light; and
a converting circuit configured to obtain image data, based on the electrical signal generated by each of the plurality of sub-pixels; and
a processing circuit configured to:
obtain an illumination and a dynamic range, based on the obtained image data;
change an exposure time of any one or any combination of the plurality of sub-pixels, based on the obtained illumination and the obtained dynamic range;
based on the obtained illumination being greater than a first threshold and the obtained dynamic range being greater than a second threshold, increase the exposure time of first ones among the plurality of sub-pixels, and maintain the exposure time of second ones among the plurality of sub-pixels; and
perform high dynamic range (HDR) processing on the obtained image data.

13. The imaging system of claim 12,
wherein the image sensor is further configured to obtain conversion image data, based on the increased exposure time of the first ones among the plurality of sub-pixels and the maintained exposure time of the second ones among the plurality of sub-pixels, and
wherein the processing circuit is further configured to perform the HDR processing on the obtained conversion image data.

14. The imaging system of claim 12, wherein the first ones among the plurality of sub-pixels are configured to generate a first part of the electrical signals generated by each of the plurality of sub-pixels, based on the received light during a first time duration; and
wherein the second ones among the plurality of sub-pixels are configured to generate a second part of the electrical signals generated by each of the plurality of sub-pixels, based on the received light during a second time duration different from the first time duration,
wherein the processing circuit is further configured to, based on the obtained illumination being less than or equal to the first threshold or the obtained dynamic range being less than or equal to the second threshold, change the exposure time of the first ones among the plurality of sub-pixels from the first time duration to the second time duration, and
wherein the image sensor is further configured to obtain conversion image data, based on the second time duration.

15. The imaging system of claim 14, wherein the processing circuit is further configured to perform tone mapping on the obtained conversion image data.

16. The imaging system of claim 14, wherein the processing circuit is further configured to further refrain from performing the HDR processing on the obtained conversion image data, based on the obtained illumination and the obtained dynamic range.

17. The imaging system of claim 12, wherein the processing circuit is further configured to, based on the obtained illumination being greater than the first threshold and the obtained dynamic range being greater than the second threshold, :
control the exposure time of the first ones among the plurality of sub-pixels to be set to a first time duration;
control the exposure time of the second ones among the plurality of sub-pixels to be set to a second time duration shorter than the first time duration; and
control the exposure time of third ones among the plurality of sub-pixels to be set to a third time duration shorter than the second time duration,
wherein the image sensor is further configured to obtain conversion image data, based on the first time duration, the second time duration and the third time duration, and
wherein the processing circuit is further configured to perform the HDR processing on the obtained conversion image data.

18. An imaging system comprising:
an image sensor comprising:
a pixel array comprising:
first sub-pixels sharing a first floating diffusion area corresponding to a first color;
second sub-pixels sharing a second floating diffusion area corresponding to a second color; and
third sub-pixels sharing a third floating diffusion area corresponding to a third color; and
a converting circuit configured to obtain current image data, based on signals that are output from the first sub-pixels, the second sub-pixels and the third sub-pixels; and
a processing circuit configured to:
obtain an illumination and a dynamic range corresponding to the obtained current image data;
perform high dynamic range (HDR) processing on next image data that is obtained after the obtained current image data, based on the obtained illumination and the obtained dynamic range;

determine an operating mode of the image sensor, among a first mode and a second mode based on the obtained illumination and the obtained dynamic range;

in the first mode, control a first exposure time of a first one among the first sub-pixels, a first one among the second sub-pixels, and a first one among the third sub-pixels, to be set to a first time duration;

in the first mode, control a second exposure time of a second one among the first sub-pixels, a second one among the second sub-pixels, and a second one among the third sub-pixels, to be set to a second time duration; and in the second mode, control a third exposure time of the first sub-pixels, the second sub-pixels and the third sub-pixels, to be set to the first time duration.

19. The imaging system of claim 18, wherein the operating mode is determined further among a third mode, and wherein the processing circuit is further configured to, in the third mode:

control a fourth exposure time of at least one among the first sub-pixels, at least one among the second sub-pixels, and at least one among the third sub-pixels, to be set to the first time duration;

control a fifth exposure time of one or more among the first sub-pixels, one or more among the second sub-pixels, and one or more among the third sub-pixels, to be set to the second time duration; and control a sixth exposure time of remaining ones the first sub-pixels, the second sub-pixels and the third sub-pixels , to be set to a third time duration.

20. The imaging system of claim 18, wherein the operating mode is determined further among a third mode, and wherein the processing circuit is further configured to, in the third mode, control a fourth exposure time of the first sub-pixels, the second sub-pixels and the third sub-pixels to be set to the first time duration, and refrain from performing HDR processing on the obtained next image data.

* * * * *